United States Patent
Tomita

(10) Patent No.: US 7,830,534 B2
(45) Date of Patent: Nov. 9, 2010

(54) INFORMATION PROCESSING APPARATUS FOR TRANSMITTING PRINT DATA TO PRINTER, PRINTING INSTRUCTION METHOD, AND STORAGE MEDIUM STORING COMPUTER PROGRAM

(75) Inventor: Atsushi Tomita, Toyohashi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 935 days.

(21) Appl. No.: 11/652,494

(22) Filed: Jan. 12, 2007

(65) Prior Publication Data

US 2007/0216938 A1 Sep. 20, 2007

(30) Foreign Application Priority Data

Mar. 15, 2006 (JP) ............................. 2006-070334

(51) Int. Cl.
*G06F 15/00* (2006.01)
*G06F 17/00* (2006.01)
(52) U.S. Cl. ..................................... 358/1.13; 715/221
(58) Field of Classification Search ................ 358/1.13, 358/1.14, 1.15, 1.16, 1.18, 1.17, 402, 3.28, 358/471; 707/769, 999.2; 715/221, 235, 715/247, 700, 863; 455/556.1, 557, 552.1; 709/217, 232; 382/202, 312, 188
See application file for complete search history.

(56) References Cited

U.S. PATENT DOCUMENTS

| | | | |
|---|---|---|---|
| 5,602,997 | A | 2/1997 | Carpenter et al. |
| 5,929,851 | A | 7/1999 | Donnelly |
| 6,976,224 | B2 | 12/2005 | Nii |
| 7,554,689 | B2 * | 6/2009 | Tonisson ................... 358/1.18 |
| 2002/0021310 | A1 | 2/2002 | Nakai et al. |

FOREIGN PATENT DOCUMENTS

| | | |
|---|---|---|
| JP | 06-202842 | 7/1994 |
| JP | 10-097406 | 4/1998 |
| JP | 11-334180 | 12/1999 |

(Continued)

OTHER PUBLICATIONS

A Notification of Reasons for Refusal issued in corresponding Japanese Patent Application No. 2006-070334, mailed Jan. 27, 2009, and an English translation thereof.

(Continued)

*Primary Examiner*—Saeid Ebrahimi Dehkordy
(74) *Attorney, Agent, or Firm*—Buchanan Ingersoll & Rooney PC

(57) ABSTRACT

Disclosed are an information processing apparatus, a printing instruction method, and a storage medium storing a computer program, that can improve the operability. When dragging and dropping of a first icon that indicates a printer onto a second icon that indicates a document to be printed is detected, or dragging and dropping of the second icon onto the first icon is detected, a signal from an input device such as a keyboard at the time of detection of the drop event is detected, and a printing condition is determined. A print data corresponding to the second icon is transmitted to the printer that is indicated by the first icon so as to print the document to be printed in the printing condition corresponding to the signal that is output from the input device.

24 Claims, 29 Drawing Sheets

FOREIGN PATENT DOCUMENTS

| | | |
|---|---|---|
| JP | 2000-227828 | 8/2000 |
| JP | 2003-157132 | 5/2003 |
| JP | 2003-241931 | 8/2003 |
| JP | 2003-316536 | 11/2003 |

OTHER PUBLICATIONS

A Decision of Refusal issued in corresponding Japanese Patent Application No. 2006-070334, mailed Aug. 11, 2009, and an English translation thereof.

* cited by examiner

Fig. 6

| IP ADDRESS | PRINTER NAME | FIRMWARE VERSION |
|---|---|---|
| 192.168.1.1 | MFP 100A | G00-01 |
| 192.168.1.2 | MFP 100B | G00-23 |
| 192.168.1.3 | PRINTER 110 | G01-39 |

Fig. 8

| DOCUMENT FORMAT | FORMAT VERSION | FILE NAME FOR MEASUREMENT | THRESHOLD A [sec] | THRESHOLD B [sec] |
|---|---|---|---|---|
| PDF | 1.3 | ts_pdf_1_3.pdf | 32.0 | 35.0 |
| PDF | 1.4 | ts_pdf_1_4.pdf | 40.0 | 45.0 |
| PDF | 1.5 | ts_pdf_1_5.pdf | 42.0 | 50.0 |
| TIFF | 2.0 | ts_tiff_2_0.tif | 25.0 | 30.0 |
| TIFF | 2.1 | ts_tiff_2_1.tif | 25.0 | 30.0 |
| ⋮ | ⋮ | ⋮ | ⋮ | ⋮ |

Fig. 9

| DOCUMENT FORMAT | FORMAT VERSION | PRINTER IP ADDRESS | PROCESS TIME [sec] |
|---|---|---|---|
| PDF | 1.3 | 192.168.1.1 | 32.0 |
| PDF | 1.3 | 192.168.1.2 | 35.5 |
| PDF | 1.3 | 192.168.1.3 | 33.4 |
| PDF | 1.4 | 192.168.1.1 | 38.9 |
| PDF | 1.4 | 192.168.1.2 | 50.1 |
| PDF | 1.5 | 192.168.1.1 | 40.3 |
| TIFF | 2.0 | 192.168.1.3 | 22.1 |
| TIFF | 2.1 | 192.168.1.3 | 22.3 |
| ⋮ | ⋮ | ⋮ | ⋮ |

Fig. 14

| PRINTER ICON ID | KEY | NAME | PRINTING CONDITION SETTING | PERMITTED USER |
|---|---|---|---|---|
| 1 | C+n | n COPIES | n COPIES,ONE-SIDE,AUTO,N,N | Admin, Ito |
| 1 | D | TWO-SIDE | 1 COPY,TWO-SIDE,AUTO,N,N | Admin, Ito |
| 1 | N | 2in1 | 1 COPY,2in1,AUTO,N,N | Admin, Ito |
| 1 | S | STAPLE | 1 COPY,ONE-SIDE,AUTO,Y,N | Admin, Ito |
| 1 | P | PUNCH | 1 COPY,ONE-SIDE,AUTO,N,Y | Admin, Ito |
| 1 | F1 | TWO-SIDE 10 COPIES | 10 COPIES,TWO-SIDE,AUTO,N,N | Admin, Ito |
| 1 | F2 | 10 COPIES STAPLE | 10 COPIES,ONE-SIDE,AUTO,Y,N | Admin, Ito |
| 2 | C+n | n COPIES | n COPIES,ONE-SIDE,AUTO,N,N | Admin |
| 2 | D | TWO-SIDE | 1 COPY,TWO-SIDE,AUTO,N,N | Admin |
| 2 | F1 | FEEDING TRAY 1 | 1 COPY,ONE-SIDE,TRAY1,N,N | Admin |
| 2 | F2 | FEEDING TRAY 2 | 1 COPY,ONE-SIDE,TRAY2,N,N | Admin |
| 2 | F3 | FEEDING TRAY 3 | 1 COPY,ONE-SIDE,TRAY3,N,N | Admin |
| 3 | C+n | n COPIES | n COPIES,ONE-SIDE,AUTO,N,N | Admin, Ito |
| 3 | N | 2in1 | 1 COPY,2in1,AUTO,N,N | Admin, Ito |
| 3 | F1 | 2in1 10 COPIES | 10 COPIES,2in1,AUTO,N,N | Admin, Ito |

Fig. 22

PRINTING CONDITION REGISTRATION

PRINTER ICON ID : 3

| KEY | : | F 1 |
| --- | --- | --- |
| NAME | : | 2in1 10 copies |
| NO OF COPIES | : | 1 0 |
| PRINT TYPE | : | 2in1 |
| FEED TRAY | : | AUTO |
| STAPLE | : | NO |
| PUNCH | : | NO |

PERMITTED USER

CANCEL

O K

INFORMATION PROCESSING APPARATUS FOR TRANSMITTING PRINT DATA TO PRINTER, PRINTING INSTRUCTION METHOD, AND STORAGE MEDIUM STORING COMPUTER PROGRAM

This application is based on the Japanese Patent Application No. 2006-070334 filed on Mar. 15, 2006, the content of which is hereby incorporated by reference.

BACKGROUND OF THE INVENTION

1. Field of the Invention

The present invention relates to an information processing apparatus for transmitting print data to a printer, a printing instruction method, and a storage medium storing a computer program.

2. Description of Related Art

Various techniques of print instruction for an image forming device with transmitting data indicating the printing details thereto have been conventionally devised. A printer driver that has a function of generating a PDL (page description language) instructs an image forming device to print with converting an instruction that is issued by an operating system (OS) or an application program into a PDL, and transferring the PDL to the image forming device.

On the other hand, in some of recent image forming devices, a function for performing a printing process by transmitting an image file, for example, in a PDF (portable document format) or TIFF (tagged image file format) format to the image forming devices without converting it into a PDL is installed. In a case where a display unit such as a CRT and a liquid crystal display is provided on the side of an external apparatus such as a personal computer (PC) for instructing the image forming device to print, techniques are put into practice that display an icon indicating a file, for example, in the PDF or TIFF format that is to be printed, and an icon indicating the image forming device on the display unit, and instruct printing by dragging and dropping one icon onto the other icon.

JP 2003-241931A discloses a technique that displays a thumbnail indicating a file on a display unit, and that displays a list of printing conditions that are registered in advance when the thumbnail is dragged onto a printer icon using a pointing device such as a mouse. When the user further drags the thumbnail to any one of the printing conditions in the displayed list and drops the thumbnail thereonto, it is possible to print the file in the selected printing condition.

When the technique in JP 2003-241931A described above is applied, the position of the drop event may be displaced from the intended position depending on such as an appearance of the list, a use environment, or the character of a user. For example, the URLs (uniform resource locators) of WWWs (world wide webs) are often registered in "favorite", and there is a case in which an unintended URL is mistakenly selected when selecting a registered URL. Usually, no actual harm is caused in the case of the WWW, but in a case where printing conditions are selected, for example, if the position of the drop event is displaced due to a hand trembling with cold, an erroneous selection is made and it may lead to waste of resources such as recording paper.

SUMMARY OF THE INVENTION

The present invention was arrived at in view of the above-described problem, and it is an object thereof to provide an information processing apparatus, a printing instruction method, and a storage medium storing a computer program, that can improve the operability.

An information processing apparatus according to one aspect of the present invention includes: a display unit that displays an image on a display screen; a pointing device signal receiving unit that receives a signal from a pointing device; an input device signal receiving unit that receives a signal from an input device from which when one or more positions are pressed by an operator, a signal corresponding to the pressed positions is output; an icon display controller that displays a first icon that indicates the printer and a second icon that indicates a document on the display screen; a pointing device event detector that detects that the second icon is dragged and dropped onto the first icon, and/or that the first icon is dragged and dropped onto the second icon, using the pointing device on the display screen; an input device signal detector that detects a signal from the input device at the time of detection of the drop event by the pointing device event detector; a printing condition setting storing unit that stores a printing condition registered for the printer indicated by the first icon corresponding to a signal detected by the input device signal detector; a print data generator that generates print data corresponding to the document indicated by the second icon when the drop event is detected, the print data being to be processed in the printer indicated by the first icon based on a printing condition that corresponds to the signal detected by the input device signal detector; and a print data transmitter that transmits generated print data to the printer indicated by the first icon.

In the configuration of the present invention, a registered printing condition for the printer indicated by the first icon corresponding to a signal from an input device (such as a keyboard) from which when one or more positions are pressed by an operator, a signal corresponding to the pressed positions is output is stored. A printing condition is determined based on a signal that is output from the input device at the time of detection of the drop event. Thus, an erroneous selection of a printing condition caused by, for example, a displacement of a selected position using the pointing device is prevented, and thus the operability can be improved.

A recording medium according to another aspect of the present invention stores a program that is to be installed on an information processing apparatus that transmits a print data to a printer, wherein the program lets the information processing apparatus execute: a pointing device input receiving process of receiving an input from a pointing device; an input receiving process of receiving an input from an input device from which when one or more positions are pressed by an operator, a signal corresponding to the pressed positions is output; an icon display process of displaying a first icon that indicates the printer and a second icon that indicates a document on a display screen; a drop event detecting process of detecting that the second icon is dragged and dropped onto the first icon, and/or that the first icon is dragged and dropped onto the second icon, using the pointing device on the display screen; an input signal detecting process of detecting a signal output from the input device at the time of detection of the drop event in the drop event detecting process; a printing condition determination process of determining a printing condition based on a signal detected in the input signal detecting process, referring to a printing condition setting storing unit that stores a printing condition registered for the printer indicated by the first icon corresponding to a signal detected in the input signal detecting process; and a printing instruction process of transmitting print data corresponding to the document indicated by the second icon to the printer indicated by the first icon, the print data being to be processed in the printer based on a printing condition that is determined in the printing condition determination process.

Note that the term "program" given above is not limited to a program that can be directly executed by a processor such as a CPU, and also includes a program in the form of a source program, a program that has been compressed, a program that has been encrypted, and the like.

In addition, when the "program" referred to above is realized using the functions of a general-purpose program such as an operating system (OS), in the scope of the present invention, the recording medium according to the present invention is not limited to including code that realizes such functions of the OS. Without including code for realizing functions such as pointing device event detection and detection of signal from a keyboard, the program may cause a processor to execute a process using the functions of the OS.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a diagram showing one example of the contents of a printer registration table.

FIG. 8 is a diagram showing one example of the contents of a performance measurement document table.

FIG. 9 is a diagram showing one example of the contents of a performance information table.

FIG. 14 is a diagram showing one example of the contents of a printing condition setting table.

FIG. 22 is a view showing one example of a printing condition registration screen.

DETAILED DESCRIPTION OF THE PREFERRED EMBODIMENT

Hereinafter, embodiments of the present invention will be described with reference to the accompanying drawings.

Embodiment 1

(1) Configuration of the Print System

Figure 1:
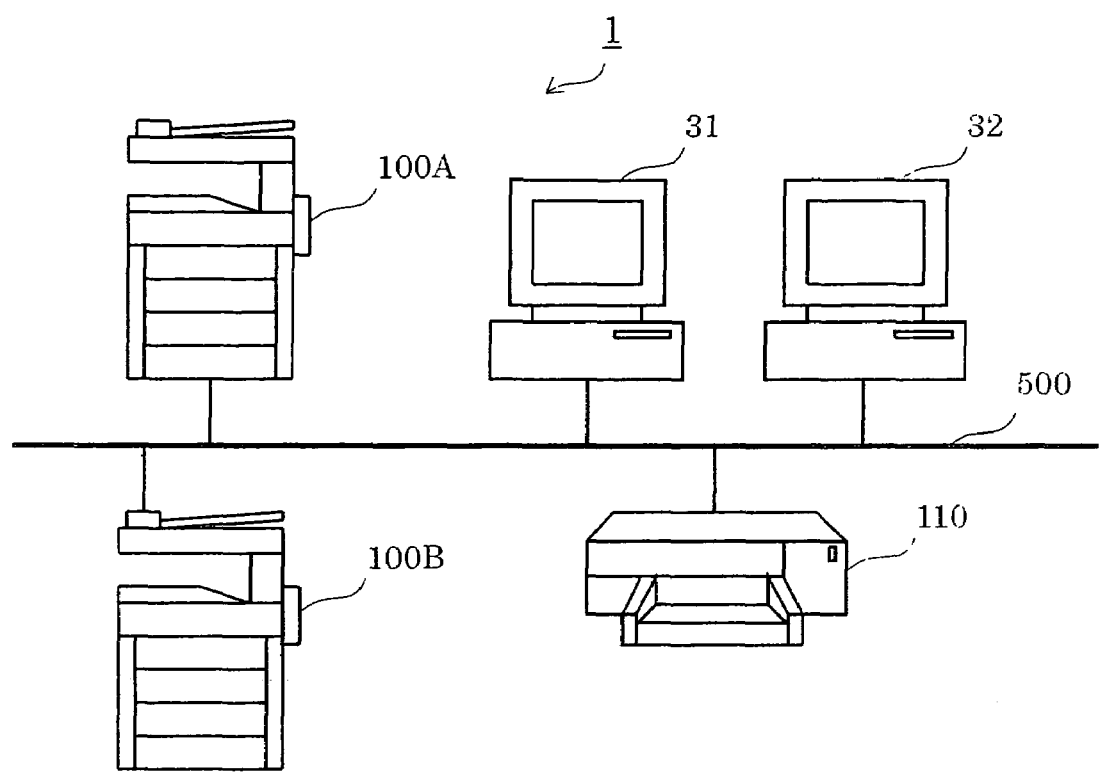
FIG. 1 is a view showing one example of the overall configuration of a print system.

FIG. 1 is a view showing one example of the overall configuration of a print system of this embodiment. In a print system 1, MFPs (multifunction peripherals) 100A and 100B, a printer 110, and personal computers (PCs) 31 and 32 are connected via a LAN (local area network) 500.

The PC 31 is one example of an information processing apparatus of this embodiment. More specifically, a computer program for achieving the information processing apparatus of this embodiment is installed on the PC 31. The computer program may be supplied in a form stored in various storage media such as a CD-ROM, a DVD-ROM, a USB memory, and a memory card.

Herein, the computer program includes programs in a source program format, compressed programs, and encrypted programs, for example, in addition to programs that can be directly executed by a processor such as a CPU.

Moreover, this embodiment includes, for example, detection of various mouse events such as a drag event and a drop event and detection of input signals of an input device such as a keyboard, and similar contents that are preferably implemented by taking advantage of the function of an operating system (OS). The computer program according to the present invention is not limited to a program including a code for implementing these functions of the OS, and the computer program may let an information processing apparatus perform a process taking advantage of the functions of the OS, without including a code for implementing the functions.

Referring back to FIG. 1, the MFP 100A, the MFP 100B, and the printer 110 are an example of the image forming devices (hereinafter, "image forming device" is sometimes referred to as "printer") that are instructed by the information processing apparatus to print. An MFP is an image forming device in which, for example, copier, network printer, scanner, facsimile, and document server functions are integrated. The MFP is also called a multifunction device, for example.

The PC 32 of this embodiment has a role as a performance management server for the printers, and obtains performance information by measuring the processing performance of the MFP 100A, the MFP 100B, and the printer 110. The LAN 500 is one example of a connection form between the information processing apparatus and the printers, and may be connected with or without wires. Any number of PCs and printers may be connected to the LAN 500, and it is possible to transmit a printing command to a printer such as the MFP 100A from any one of PCs on which the information processing apparatus of this embodiment is installed.

(2) Configuration of the Image Forming Device

Figure 2:
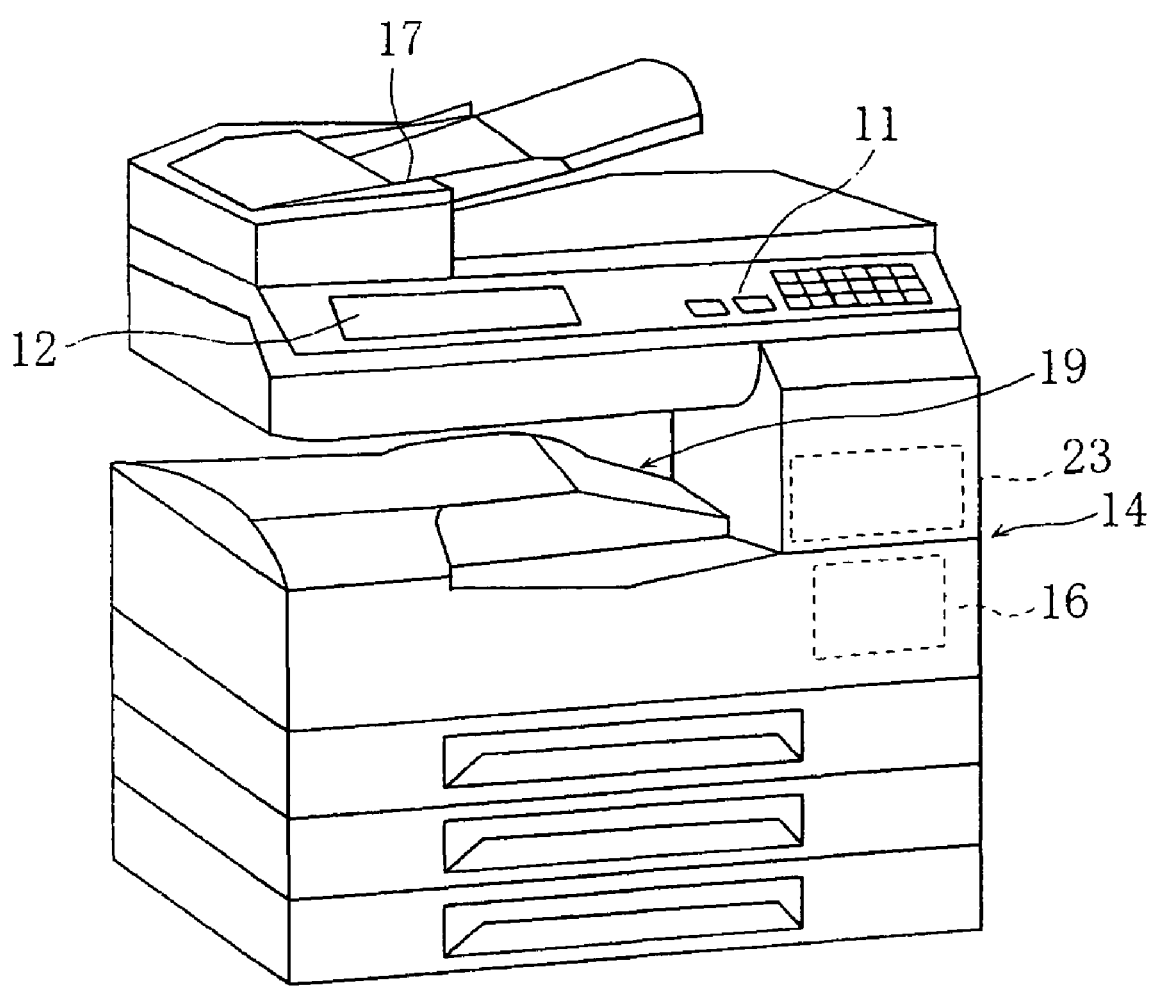
FIG. 2 is a perspective view showing one example of the appearance of an MFP.
Figure 3:
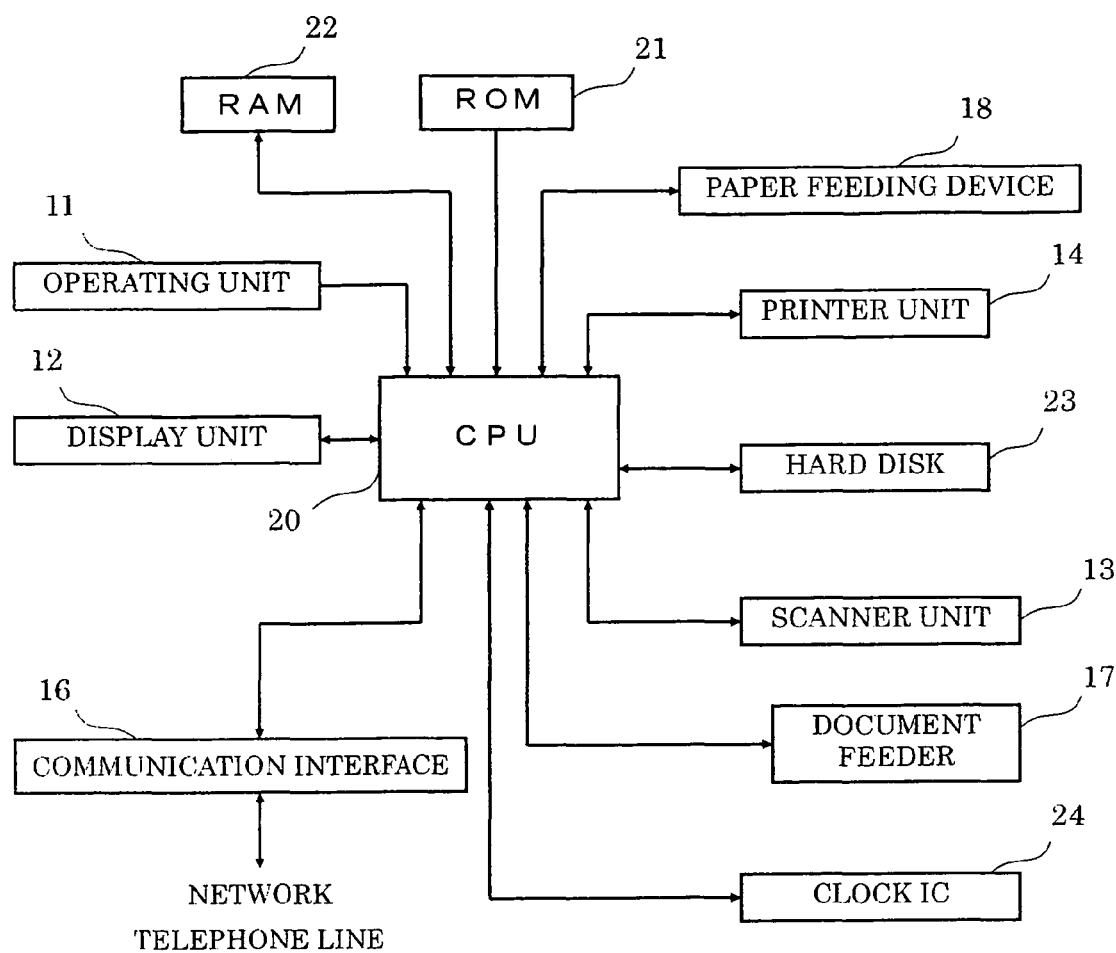
FIG. 3 is a diagram showing one example of the hardware configuration of the MFP.

Next, the configuration of the printers of this embodiment is described taking the MFP 100A as an example. FIG. 2 is a perspective view showing one example of the appearance of the MFP 100A. FIG. 3 is a diagram showing one example of the hardware configuration of the MFP 100A.

The MFP 100A includes, for example, an operating unit 11, a display unit 12, a scanner unit 13, a printer unit 14, a communication interface 16, a document feeder 17, a paper feeding device 18, a tray 19 (see FIG. 2), a CPU 20, a ROM 21, a RAM 22, a hard disk 23, and a clock IC 24.

The operating unit 11 includes a plurality of keys for inputting numbers, characters, symbols and the like, a sensor that recognizes any key pressed, and a transmitting circuit that transmits a signal indicating any key recognized to the CPU 20, for example.

The display unit 12 displays, for example, a screen that displays messages to a user, a screen on which a user inputs the details of settings and processes, and a screen that displays results of processes performed with the MFP 100A. In this embodiment, a touch panel is applied to the display unit 12. The touch panel is provided with a function for detecting a position on the touch panel that is touched by a user, and transmitting signals indicating the detection results to the CPU 20. The touch panel is included in the operating unit 11.

The scanner unit 13 irradiates light on an original and detects the reflected light, and thus scans an image on the original at a predetermined scanning resolution, and generates digital image data (herein, density data representing the density of RGB or black). The thus obtained image data is used in the printer unit 14 for printing, and also stored on the hard disk 23 after being converted into a file in a TIFF, PDF, or JPEG format, for example. The image data may be converted into facsimile data, and output for facsimile transmission. The document feeder 17 is provided in an upper portion of the body of the MFP 100A (see FIG. 2), and used for successively transporting a single or a plurality of sheets of originals to the scanner unit 13.

The printer unit 14 prints an image that has been scanned with the scanner unit 13, an image based on data that has been transmitted from an external apparatus such as the PC 31, or an image of facsimile data received by fax, on a recording sheet such as paper or a film. The paper feeding device 18 is provided in a lower portion of the body of the MFP 100A, and used for feeding a recording sheet to the printer unit 14. The recording sheet on which the image is printed with the printer unit 14 is discharged onto the tray 19 (see FIG. 2).

The communication interface 16 is a device for communicating with an external apparatus such as the PC 31 via the LAN 500, or performing, for example, facsimile transmission and reception via a telephone line. As the communication interface 16, it is possible to use, for example, an NIC (network interface card), a modem or a TA (terminal adaptor).

The ROM 21 stores a program and data for implementing the basic functions of the MFP 100A, such as scanning of images, copying of originals, transmission and reception of facsimile data, network printing, and a document server function (box function). A part or the whole of this program or data may be installed on the hard disk 23. In this case, the program or data installed on the hard disk 23 is loaded into the RAM 22, as necessary.

The hard disk 23 stores a file of image data obtained by scanning an original with the scanner unit 13, and a file of image data that has been transmitted from the external apparatus such as the PC 31, for example. The clock IC 24 is used for a measurement process of the processing performance when a request to measure the performance is given from the PC 32.

(3) Process in the PC 32 (Performance Measurement Process)

Figure 4:
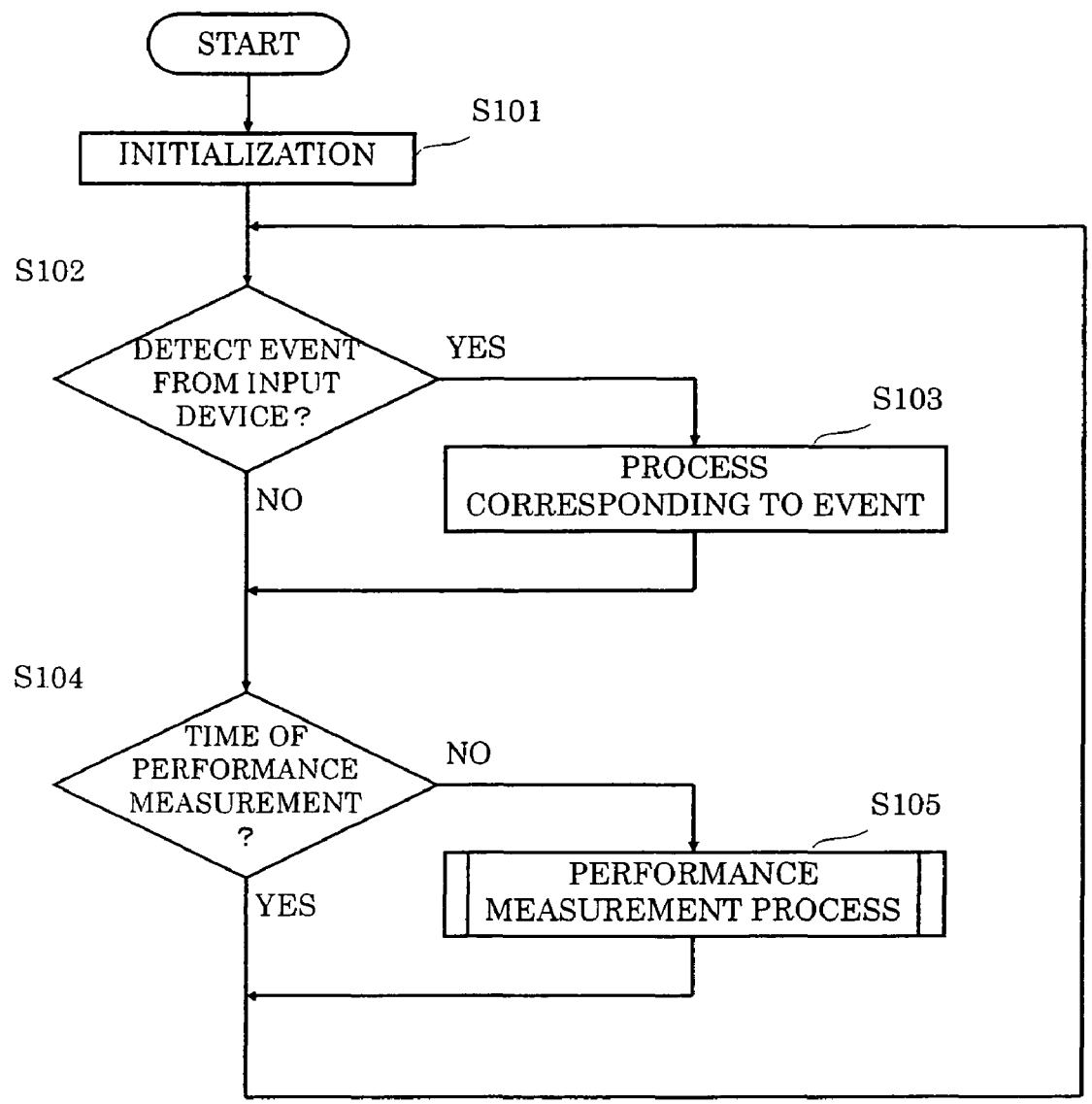
FIG. 4 is a flowchart for illustrating one example of the processing details of a PC 32.

Next, the processing details of the PC 32 (performance measurement process of the printers) in this embodiment are described. FIG. 4 is a flowchart for illustrating one example of the processing details of the PC 32.

When the power of the PC 32 is turned on, first, a general initialization process such as processes to clear the memory, to set to the standard mode, and to start the operating system (OS) is performed (S101). After the initialization, an event from the input device such as a mouse and a keyboard is detected (S102). If any event is detected (S102: YES), then a process corresponding to the detected event is performed (S103).

Next, it is judged whether the timing to measure the processing performance of the printers that are connected via the LAN 500 has come (S104). For example, it is possible to measure the processing performance at predetermined intervals such as 24 hours, on every predetermined day of week, or on every predetermined day of month.

Figure 5:
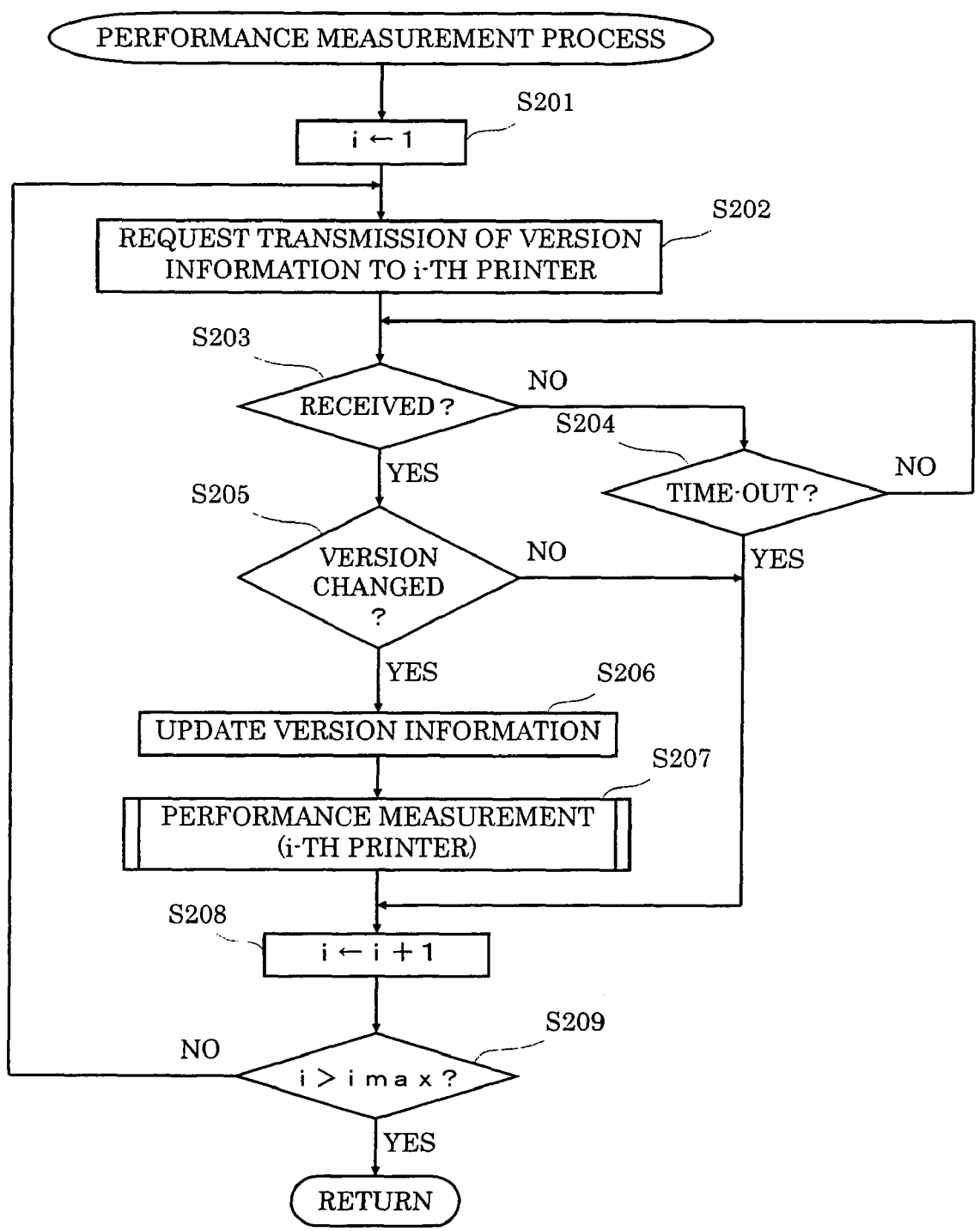
FIG. 5 is a flowchart for illustrating one example of the details of a performance measurement process in the PC 32.

If it is not the timing to measure the processing performance (S104: NO), then the procedure returns to Step S102 and the above-described process is repeated. If it is the timing to measure the processing performance (S104: YES), then a performance measurement process is performed (S105). FIG. 5 is a flowchart for illustrating one example of the details of a performance measurement process.

In the performance measurement process, first, a variable i is set to 1 (S201). The variable i corresponds to each printer, and the maximum value (imax) of the variable i is the number of printers whose processing performance is to be measured.

First, an i-th printer (such as the MFP 100A) is requested to transmit firmware version information (S202). Then, a reception of the version information from the i-th printer is waited (S203). If there is no reception when a predetermined timeout period has passed (S203: NO, S204: YES), then the procedure proceeds to Step S208 and a process for the next printer is performed.

Herein, the PC 32 stores information of the printers that are connected via the LAN 500, in a storage device such as a hard disk. FIG. 6 is a diagram showing one example of the contents of a table (printer registration table) storing information of the printers.

The contents of information stored in the printer registration table of this embodiment are the IP addresses of the printers, the names of the printers, and the firmware version information. Furthermore, it is possible to retrieve the printers that are connected to the LAN 500 using, for example, an SNMP (simple network management protocol), but it is also possible to input using an input device such as a mouse and a keyboard of the PC 32.

If the firmware version information is received from the i-th printer (S203: YES), then it is compared with the firmware version information that is stored in the printer registration table. If the firmware version has not been changed (S205: NO), then by skipping the following processes, the procedure proceeds to Step S208, and a process on the next printer is performed. This is based on an assumption that if the firmware version has not been changed, the processing performance has not been changed. Accordingly, it is also possible to transmit information indicating that the processing performance may be changed from the printer in the case where a condition of the printer is changed even when the firmware version has not been changed, and the performance measurement is performed.

Figure 7:
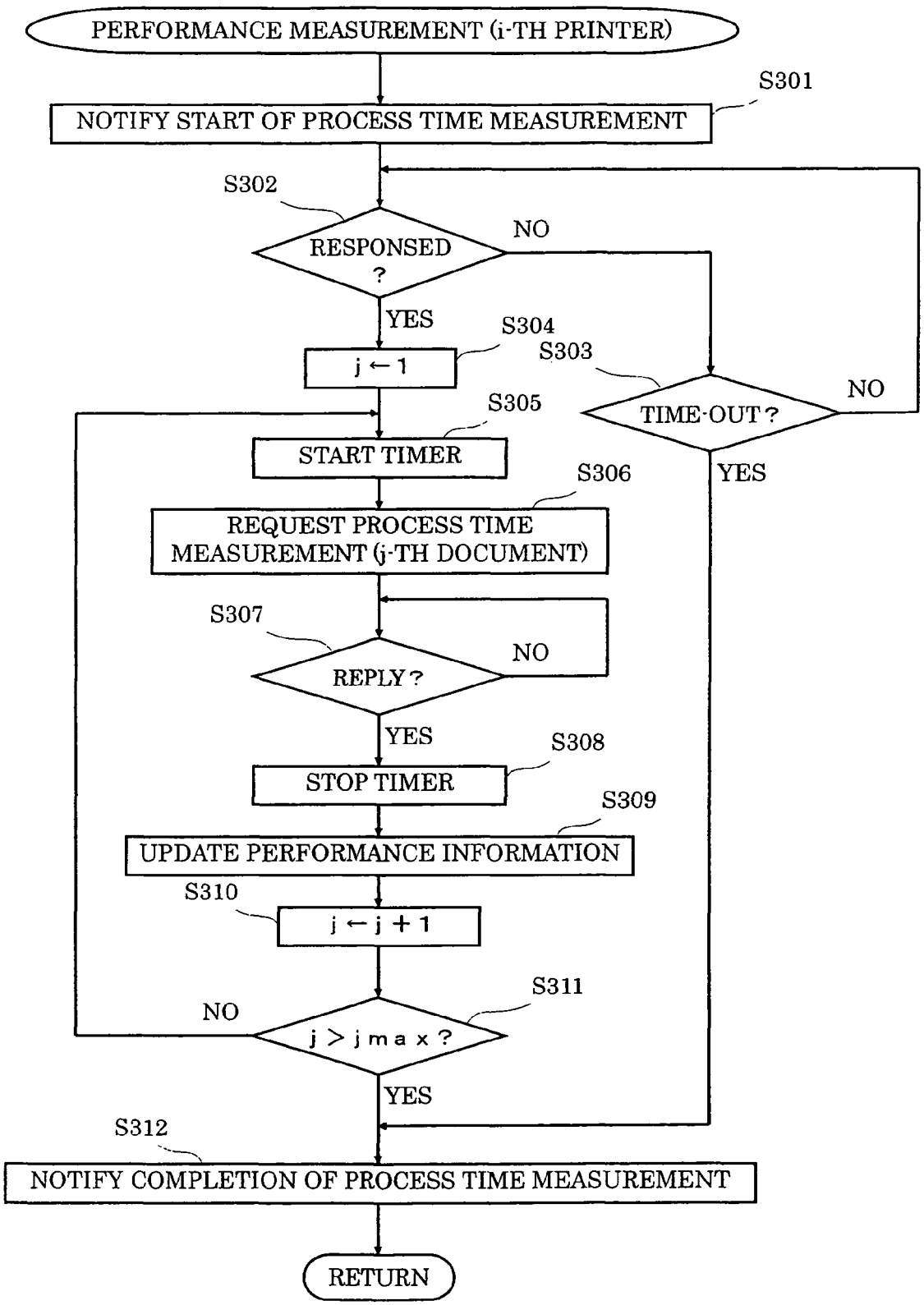
FIG. 7 is a flowchart for illustrating one example of the processing details of the performance measurement of an i-th printer in the PC 32.

On the other hand, if the firmware version has been changed (S205: YES), then the firmware version information that is stored in the printer registration table is updated (S206), and the performance measurement of the i-th printer is performed (S207). FIG. 7 is a flowchart for illustrating one example of the processing details of the performance measurement of the i-th printer.

First, the PC 32 gives a notification of the start of the process time measurement to the i-th printer (S301), and waits for a response from the printer (S302). It should be noted that the printer that has received this notification is controlled so as not to accept a process other than the process time measurement after transmitting the response until a notification of the termination of the process time measurement (described later) is received.

If there is no response from the printer when a predetermined time-out period has passed (S302: NO, S303: YES), then the PC 32 transmits the notification of the termination of the process time measurement (S312), and terminates the process time measurement.

If there is a response from the printer (S302: YES), then a variable j is set to 1 (S304), and a timer that is provided in the PC 32 is started (S305). Then, a request to measure the process time using a j-th document for measurement is transmitted to the printer (S306). The variable j indicates the type of a document for measurement. In this embodiment, this process is performed by transmitting a file in the document type j for the performance measurement from the PC 32 to the printer. It is possible to transmit a file in a page description language (PDL) format. However, a document file itself can be transmitted and used for the performance measurement, and in this case, the document is transmitted in a form interposed between PJL (printer job language) as described below, for example.

%-12345X@PJL
@PJL SET MEASUREPROCESSTIME=ON
{document}
%-12345X

Herein, the PC 32 stores information relating to files for the performance measurement, in a storage device such as a hard disk. FIG. 8 is a diagram showing one example of the contents of a table (performance measurement document table) storing information of files for the performance measurement.

As shown in FIG. 8, the performance measurement document table stores the document formats, the versions of the document formats, the file names of the documents for measurement, values of a threshold A (second), and values of a threshold B (second). The threshold A and the threshold B are thresholds that are used when determining the level of the processing performance. For example, using the thresholds, it is judged that the processing performance is in a level A (highest) if the value of the measured process time is not greater than the value of the threshold A, that it is in a level B if the value is between the value of the threshold A and the value of the threshold B, and that it is in a level C (longest process time=lowest level of performance) if the value is not less than the value of the threshold B.

Referring back to the flowchart in FIG. 7, the PC 32 is put on standby after requesting the printer to measure the process time until a reply (informing that the process on the transmitted file is terminated) from the printer is received (S307). If there is a reply (S307: YES), then the timer in the PC 32 is stopped (S308), and the performance information is updated (S309).

Herein, the PC 32 stores information relating to the performance information, in a storage device such as a hard disk. FIG. 9 is a diagram showing one example of the contents of a table (performance information table) storing performance information. In Step S309, the field of the process time in the table is updated. It should be noted that a reply indicating that the document cannot be processed may be given from the printer depending on the document file for measurement, and in this case, the process time is not recorded.

Next, the value of the variable j is incremented by one (S310), and it is judged whether the performance measurement with all documents that are stored in the performance measurement document table has been completed (S311). If it has not been completed (S311: NO), then the procedure returns to Step S305 and the performance measurement using the next document is performed. If the performance measurement with all documents has been completed (S311: YES), then a notification of the completion of the process time measurement is transmitted to the printer (S312), and the procedure returns to the flowchart in FIG. 5.

In Step S208 in the flowchart in FIG. 5, the variable i is incremented by one, and it is judged whether the performance measurement of all printers has been completed (S209). If it has not been completed (S209: NO), then the procedure returns to Step S202 and a process for the next printer is performed, and if the process for all printers has been completed (S209: YES), then the performance measurement process is terminated.

(4) Process in the Printer (Performance Measurement Process)

Figure 10:
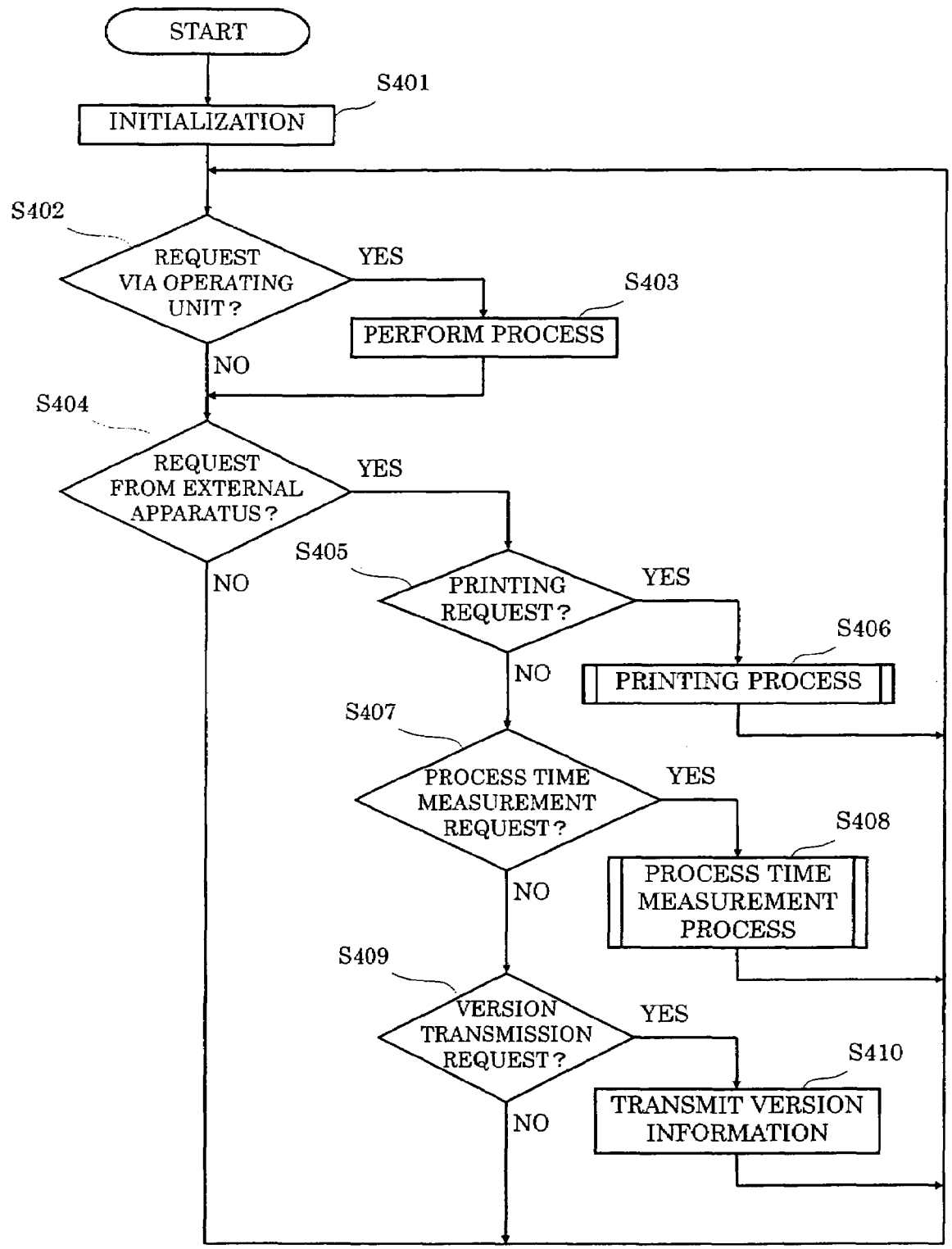
FIG. 10 is a flowchart for illustrating one example of the specific processing details of an MFP 100A.

Herein, the processes on the side of the printers such as the MFP 100A including a process performed when a request to measure the processing performance as described above is given are described. FIG. 10 is a flowchart for illustrating one example of the specific processing details of the MFP 100A as one example of the printer. The process as in FIG. 10 can be performed in a similar manner also with the MFP 100B and the printer 110.

When starting the operation, first, the CPU 20 of the MFP 100A performs an initialization process such as processes to clear the memory and to set to the standard mode (S401). After the initialization has been completed, it is judged whether a processing request is given (such as a command to perform copying, scanning, and facsimile transmission, and setting of various parameters) from the user via the operating unit 11 (S402). If a processing request is given from the operating unit 11 (S402: YES), then the process is performed based on the request (S403).

Next, it is judged whether a processing request is given from the external apparatus such as the PC 31 and the PC 32 (S404). If the request is not given (S404: NO), then the procedure returns to Step S402. If a request is given (S404: YES), and if it is a printing request (S405: YES), then a printing process is performed (S406).

Figure 11:
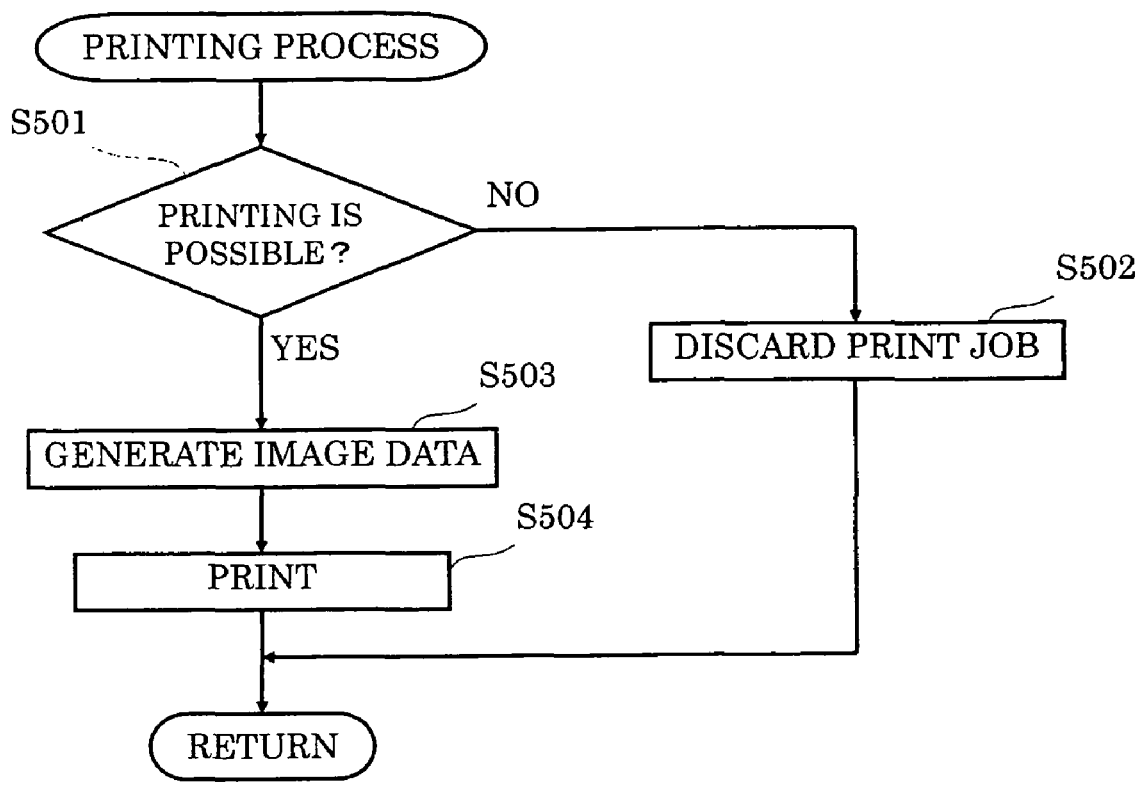
FIG. 11 is a flowchart for illustrating the details of a printing process.

FIG. 11 is a flowchart for illustrating the details of a printing process. When a printing request is received from the external apparatus such as the PC 31, first, it is judged whether printing based on the received request is possible (S501). It is possible to judge whether printing is possible, based on whether the process is possible with the MFP 100A, referring to the format of a transmitted document and the size of a designated recording sheet, for example.

If printing is not possible (S501: NO), then the received print job is discarded (S502), and the printing process is terminated. Herein, it is also possible to transmit a message to the external apparatus that has transmitted the discarded job.

If printing is possible (S501: YES), then bitmap image data is generated from the received data for printing (S503), and printing is performed based on the generated image data (S504).

Referring back to the flowchart in FIG. 10, if the request from the external apparatus is the above-described request to measure the process time (S407: YES), then the process time measurement process is performed (S408). It is possible to judge whether the request is a request to measure the process time, for example, by referring to the setting such as "@PJL SET MEASUREPROCESSTIME=ON" in the PJL described above, but the judgment method is not limited to this.

Figure 12:
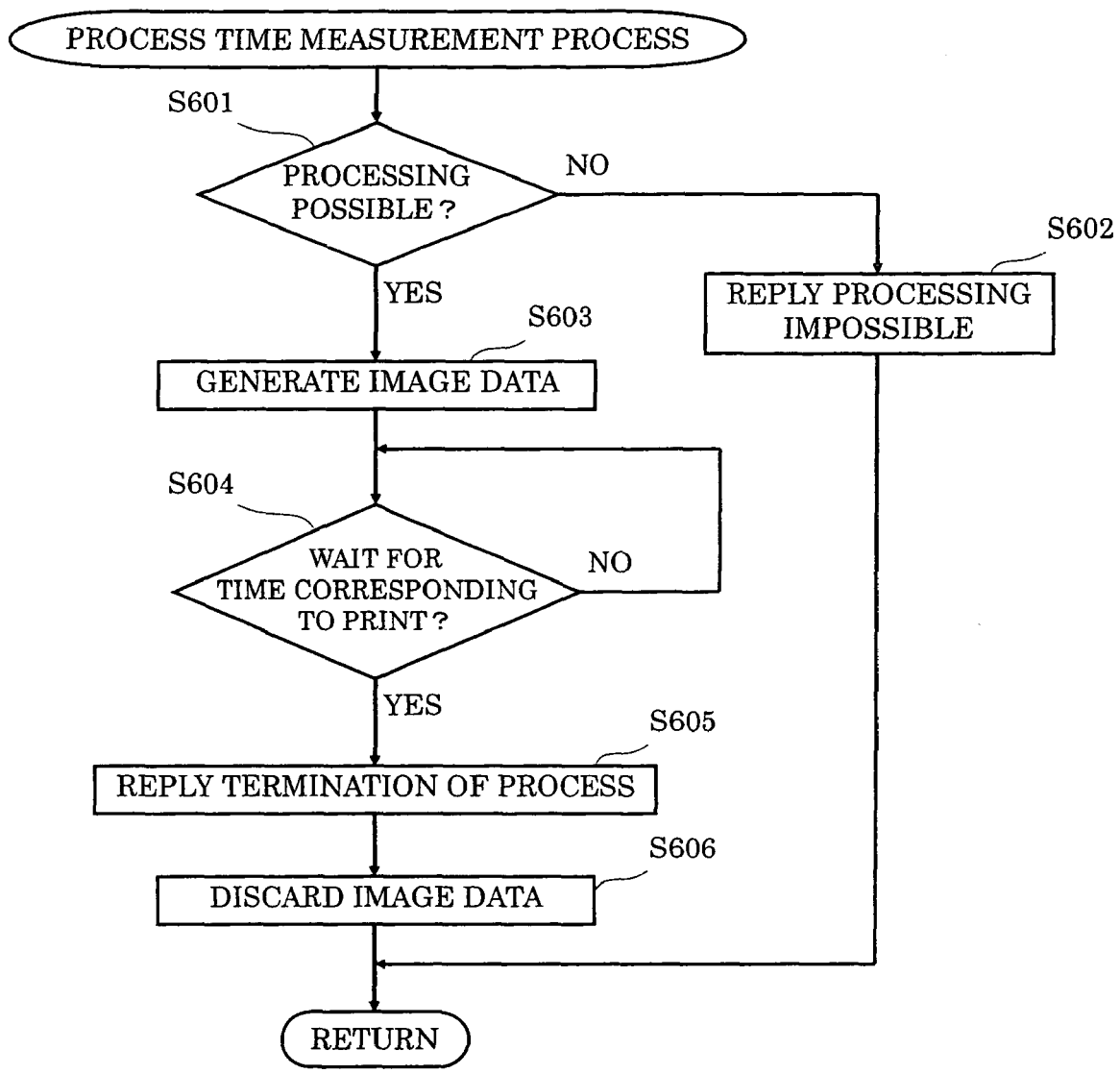
FIG. 12 is a flowchart for illustrating the details of a process time measurement process on the side of, for example, the MFP 100A.

FIG. 12 is a flowchart for illustrating the details of the process time measurement process. In the process time measurement process on the side of the MFP 100A, first, it is judged whether a document file for the performance measurement included in the received measurement request can be processed with the MFP 100A (S601). If the document file cannot be processed (S601: NO), then a reply indicating that the document file cannot be processed is transmitted to the source (the PC 32 in this embodiment) of the measurement request (S602), and the process time measurement process is terminated.

If the document file can be processed (S601: YES), then bitmap image data is generated from the document file (S603). Then, using the clock IC 24, waiting of the time corresponding to the time necessary to print is performed (S604). For example, in the case of a printer that can print 30 pages per minute, the time necessary to print one page is an average of two seconds, and thus in this case, waiting of two seconds is performed in Step S604.

When the waiting time has passed (S604: YES), then a reply notifying the termination of the process is transmitted to the source (the PC 32 in this embodiment) of the measurement request (S605), and the image data that is generated in Step S603 is discarded (S606), and the process time measurement process is terminated.

(5) Configuration of the Information Processing Apparatus (the PC 31)

Figure 13:
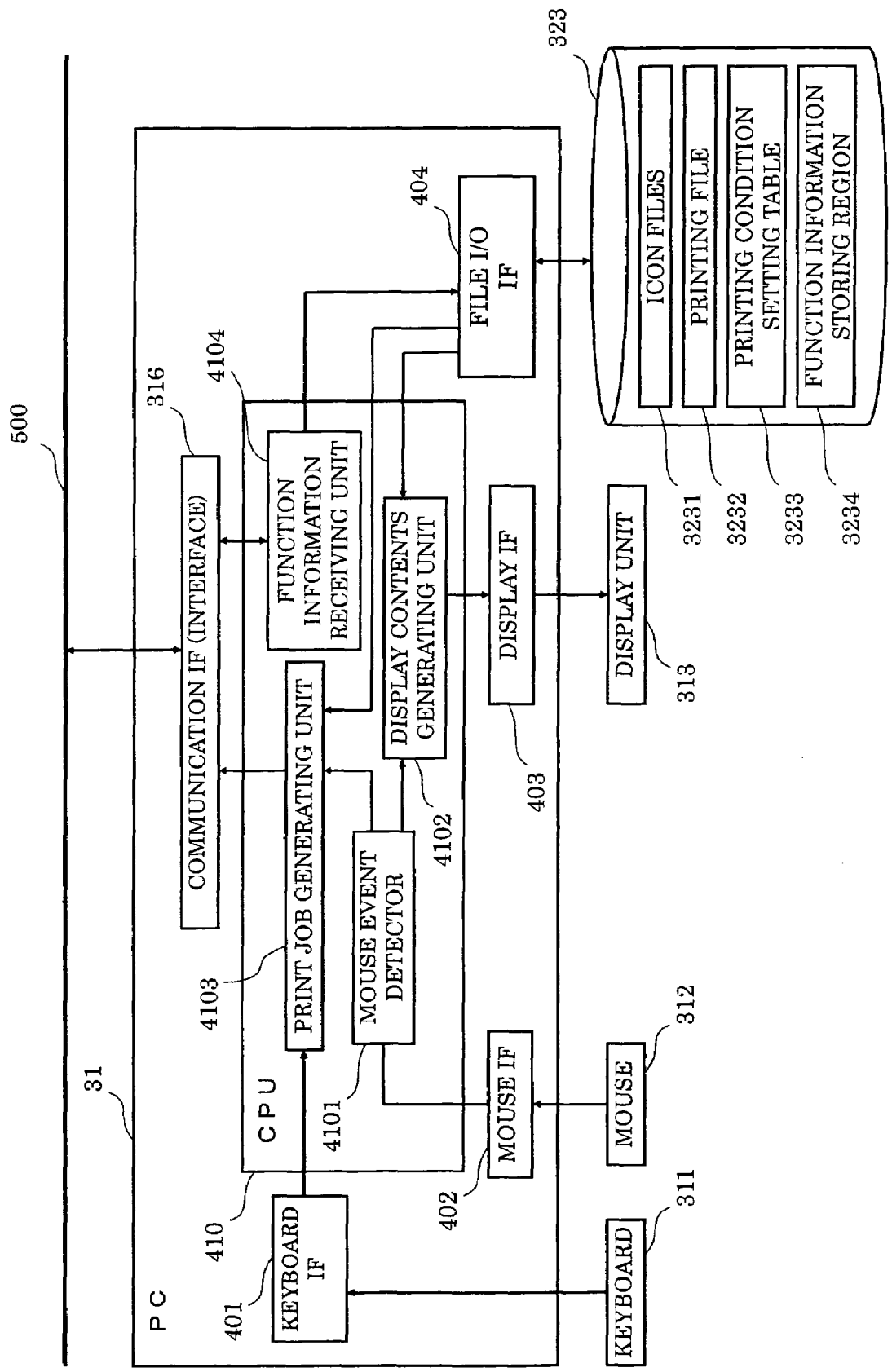
FIG. 13 is a block diagram for illustrating one example of the functional configuration of the PC 31.

Next, the configuration of the information processing apparatus that is installed on the PC 31 in this embodiment is described. FIG. 13 is a block diagram for illustrating one example of the functional configuration of the PC 31.

The PC 31 is provided with a keyboard 311, a mouse 312 as one example of the pointing device, a display unit 313, and a hard disk 323 as one example of the storage device. The pointing device may be connected with or without wires, and may be included in the PC 31.

The hard disk 323 stores icon files 3231 for displaying icons on the display unit 313. The hard disk 323 also stores a printing file 3232 that are to be printed with the image forming device. The icon files 3231 include files for displaying icons on the display unit 313, for example, icon indicating the printing file 3232, and icons respectively indicating the image forming devices such as the MFP 100A and 100B, and the printer 110.

The hard disk 323 stores a printing condition setting table 3233. The printing condition setting table 3233 is a table storing the correspondence between input signals from the keyboard 311 (signals that are output from the keyboard 311, indicating the keys pressed) and the printing condition settings. FIG. 14 is a diagram showing one example of the contents of the printing condition setting table 3233. A method for using this table is described later in detail.

Referring back to FIG. 13, the hard disk 323 is provided with a function information storing region 3234. The function information storing region stores information of the processing performance of the printers measured with the PC 32 as described above and information indicating the functions that are provided in the printers, for example.

The PC 31 is provided with a communication IF (interface) 316. As the communication IF 316, it is possible to use an NIC (network interface card), for example.

The PC 31 is provided with a keyboard IF (interface) 401, a mouse IF (interface) 402, a display IF (interface) 403, a file input/output IF (interface) 404, and a CPU (central processing unit) 410. The CPU 410 is provided with a mouse event detector 4101, a display contents generating unit 4102, a print job generating unit 4103, and a function information receiving unit 4104.

The keyboard IF 401 transmits input signals from the keyboard 311 to the CPU 410. The mouse IF 402 transmits input signals from the mouse 312 to the CPU 410. The file input/output IF 404 stores files on the hard disk 323, and reads out the files from the hard disk 323.

The display contents generating unit 4102 generates the contents that are to be displayed on the display unit 313. The display IF 403 displays the generated contents on the display unit 313. The display contents generating unit 4102 of this embodiment generates information indicating the display contents such that icons respectively indicating the image forming devices such as the MFP 100A and 100B, and the printer 110, and an icon indicating a file to be printed that are shown as the printing file 3232 are displayed on the display unit 313, using the icon files 3231 that are read out from the hard disk 323.

The mouse event detector 4101 detects events that occur when a mouse pointer is moved by operating the mouse 312, or buttons etc. provided on the mouse 312 is operated. Examples of events detected include a select event of an icon by operating a button, a drag event and a drop event of the selected icon, an overlap event of the dragged icon on another icon. As the mouse event detector 4101, it is possible to use the function that is provided in the operating system (OS).

The print job generating unit 4103 generates a print job in response to input from the keyboard 311 and the mouse 312. The generated print job is transmitted via the communication IF 316 and the LAN 500 to a printer selected as a destination printer from among the printers such as the MFP 100A and 100B, and the printer 110.

The function information receiving unit 4104 receives performance information of the printers from the PC 32 via the LAN 500, and stores the information on the hard disk 323. In addition to the performance information, information indicating the functions (such as whether two-side printing is possible and whether post-processing such as punch and staple processes is possible) that are provided in the printers can be received from the printers and stored on the hard disk 323. It should be noted that the information indicating the functions may be input using the input device such as the keyboard 311.

When the user performs a process in which an icon of a file to be printed that is displayed on the display unit 313 is dragged and dropped onto an icon of a printer, or reversely, an icon of a printer is dragged and dropped onto an icon of a file to be printed, the information processing apparatus of this embodiment submits a print job to the printer that is indicated by the icon.

A print job is generated by the print job generating unit 4103. When generating a print job, the print job is generated such that printing is performed in the printing condition according to the key of the keyboard 311 that is pressed at the time of a drop event, referring to the printing condition setting table shown in FIG. 14.

(6) Processing Details of the PC 31

Figure 15:
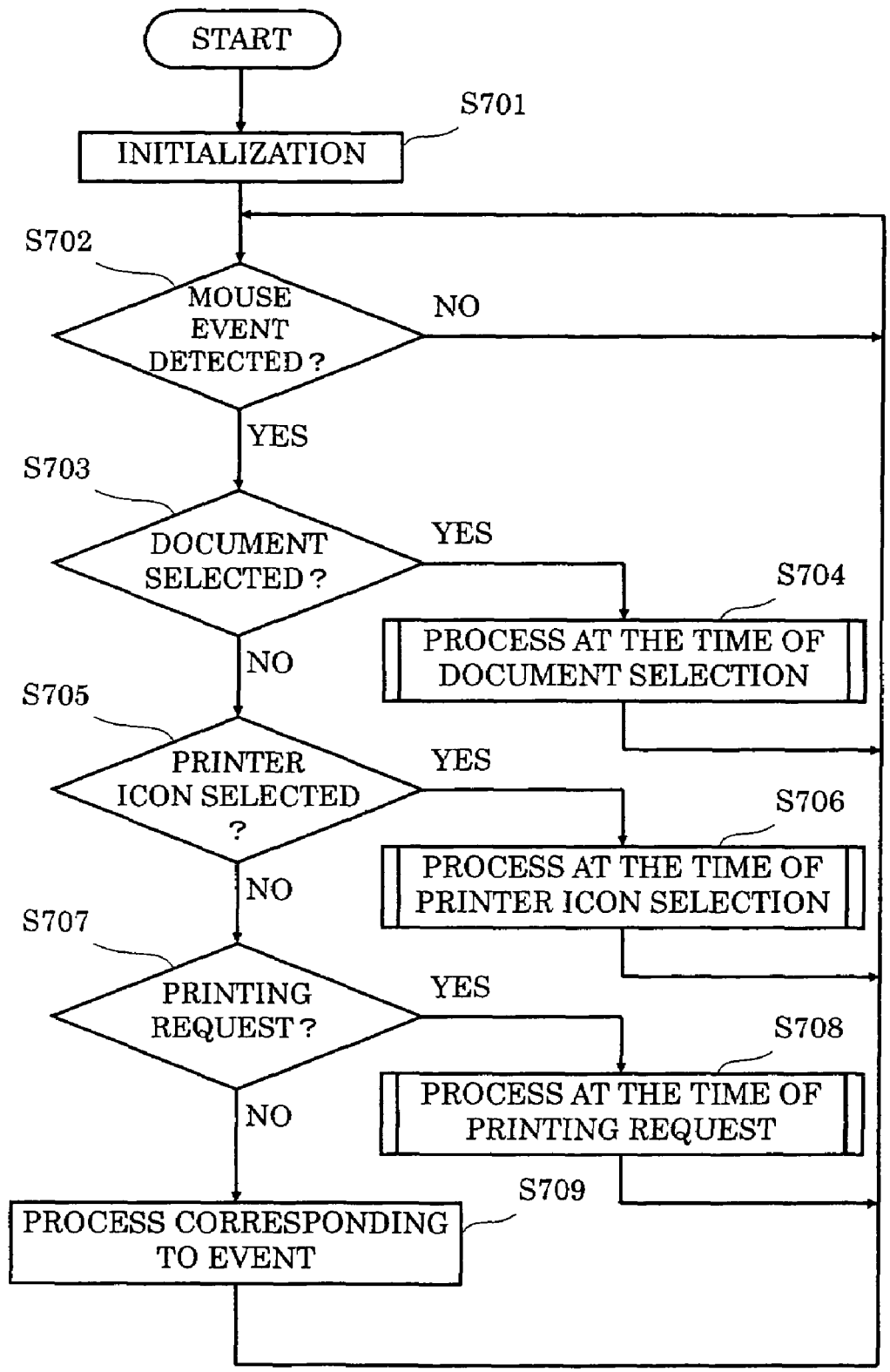
FIG. 15 is a flowchart for illustrating one example of the processing details of the PC 31 in a first embodiment.

Hereinafter, the processing details of the PC 31 are described. FIG. 15 is a flowchart for illustrating one example of the processing details of the PC 31 in this embodiment. In the example in FIG. 15, first, the initialization such as a process to clear the memory is performed (S701). Then, it is detected whether a mouse event has occurred (S702), and if a mouse event is detected (S702: YES), then the procedure proceeds to the following processes.

Figure 16:
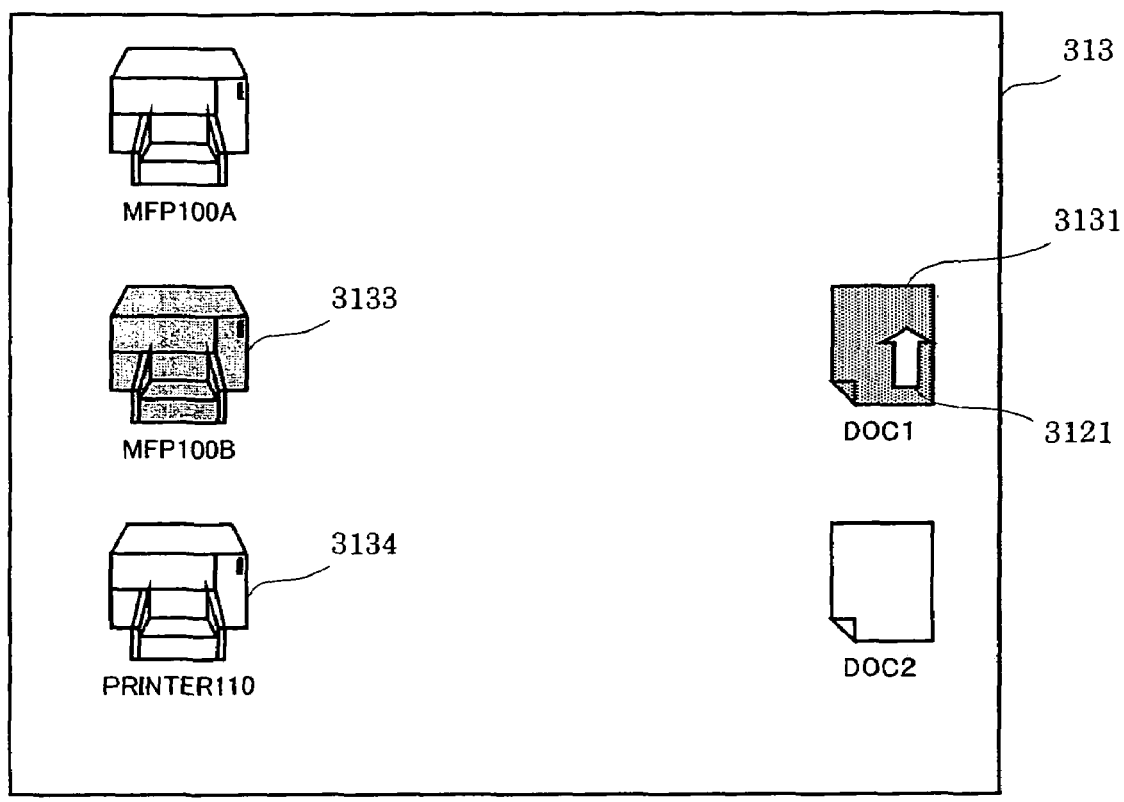
FIG. 16 is a view showing one example of the contents displayed on a display unit 313 in the first embodiment.

First, it is judged whether any one of the icons of the files (documents) that are to be printed, among the icons of printing files that are displayed on the display unit 313, is selected by the mouse 312 (S703). FIG. 16 is a view showing one example of the contents displayed on the display unit 313. Such a screen can be displayed in, for example, the so-called desktop environment (in a case where Windows (registered trademark) is used as the OS), but it is not limited to that environment.

It is possible to judge whether a document is selected, for example, by detecting that any one (an icon 3131 indicting the file "DOC1" in the example in FIG. 16) of the icons of the documents that are displayed on the display unit 313 is selected by operating a button of the mouse 312 (for example, by positioning a mouse cursor 3121 on the icon and clicking the left button).

Figure 17:
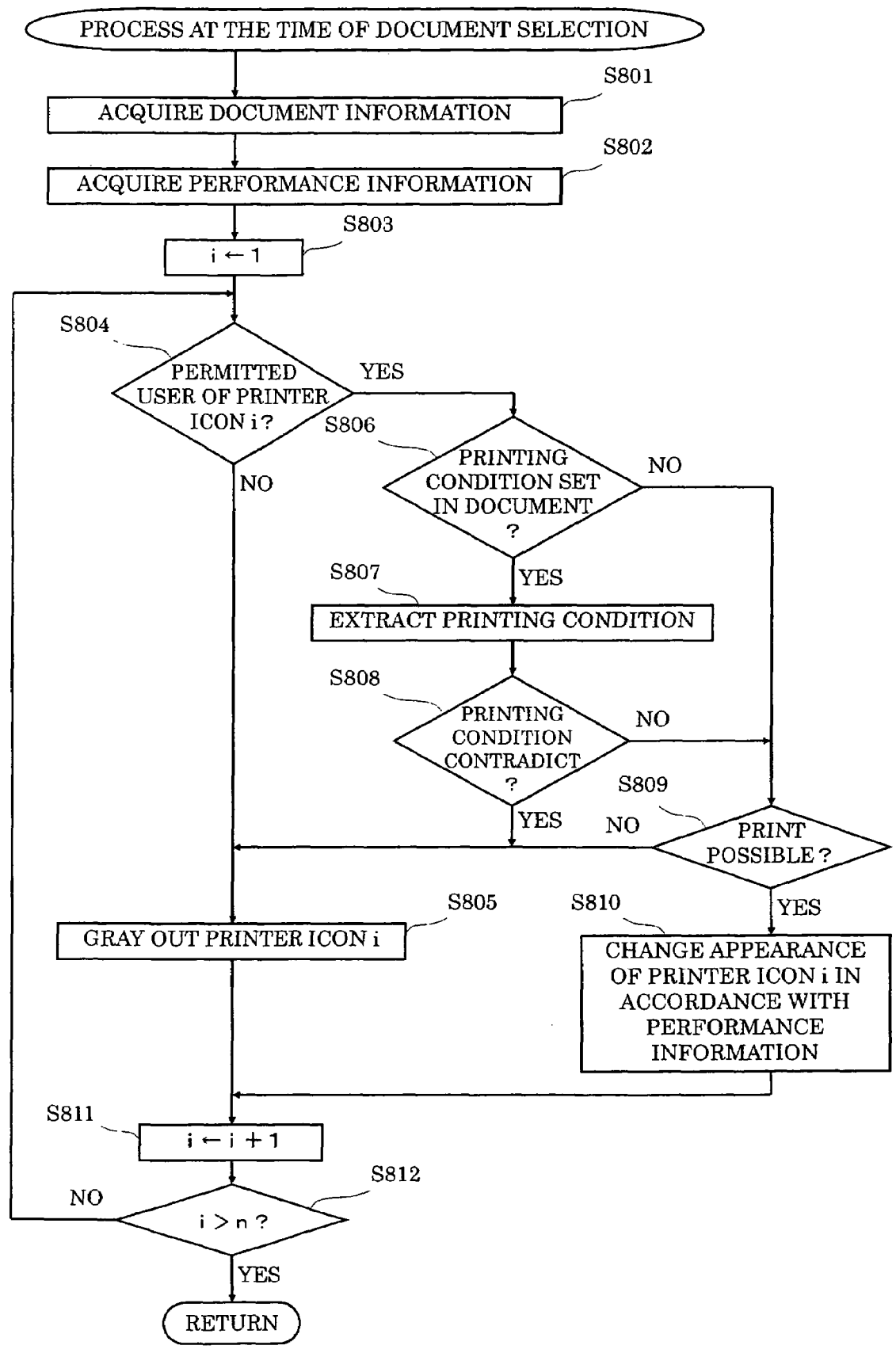
FIG. 17 is a flowchart for illustrating one example of the details of a process at the time of a document selection in the first embodiment.

If a document is selected (S703: YES), then a process at the time of the document selection is performed (S704). FIG. 17 is a flowchart for illustrating one example of the details of a process at the time of the document selection.

In the process at the time of the document selection, the document information of the selected document is acquired (S801). This document information is information such as the document format (such as PDF and TIFF) and the format version.

For example, in a file name "DOC1.pdf", the extension indicates that it is a PDF file. Furthermore, in a PDF file, the property information of the document is contained in a predetermined format, and the PDF version can be obtained from this information.

After the document information is acquired, performance information is read out from the function information storing region 3234 (S802). The performance information is the same as that exemplified in FIG. 9. This performance information may be acquired from the PC 32 and stored in the function information storing region 3234 of the hard disk 323 at the time of the initialization, or may be regularly acquired from the PC 32. It is also possible to apply a configuration in which the performance information is transmitted from the PC 32 to each PC when the performance information inside the PC 32 is updated.

After the performance information is acquired, a process described below is performed with respect to all printer icons that are displayed on the display unit 313. First, the variable i indicating the printer icon ID (see FIG. 14) is set to 1 (S803).

Then, it is judged whether the user operating the PC 31 is registered as a permitted user for the printer indicated by the icon of the printer i referring to the printing condition setting table 3233 (S804). In this embodiment, the user operating the PC 31 is identified based on the user name (user identifier) that is input when logging in the PC 31.

If the user is not a permitted user for the printer indicated by the icon of the printer i (S804: NO), then the icon of the printer i is grayed out (S805). In the example in FIG. 16, an icon 3133 indicating the MFP 100B is grayed out, and in this state, the printing process is not performed even if the icon 3131 of the DOC1 is dragged and dropped onto the icon 3133.

If the user is a permitted user (S804: YES), then it is judged whether a printing condition is set in the document file (S806). If a printing condition is set in the file (S806: YES), then the printing condition is extracted (S807), and it is judged whether the printing condition set for the document contradicts the printing conditions operable on the printer indicated by the icon of the printer i (S808).

The reason for this is that it may be possible to set a printing condition for a document and to store the printing condition in the document file, for example, in a PDF format, and in this case, it is preferable to judge whether the printing condition set for the document does not contradict the printing condition in which the printer can operate.

Accordingly, this judgment is performed by comparing the printing condition set for the document with the printing condition in which the printer can operate. If the printing condition set for the document is not operable (S808: YES), then the icon of the printer i is grayed out (S805).

On the other hand, if no printing condition is set for the document (S806: NO), or if there is no contradiction in the printing conditions (S808: NO), then it is judged whether the selected document can be processed with the printer indicated by the icon of the printer i (S809). If the processing is not possible (S809: NO), then the icon of the printer i is grayed out (S805).

If the processing for the document is possible (S809: YES), then an appearance of the icon of the printer i is changed in accordance with the performance information of printer i (S810). For example, referring to the performance information, if the value of the process time is not greater than the value of the threshold A (it is judged that the printer is most appropriate as a printer used), then the icon of the printer i is displayed in blue. If the value of the process time is between the value of the threshold A and the value of the threshold B, then the icon of the printer i is displayed in yellow. If the value of the process time is not less than the value of the threshold B (it is judged that the printer is not so appropriate as a printer used), then the icon of the printer i is displayed in red for alerting the user.

If the above-described process has been completed with respect to all printer icons that are displayed on the display unit 313 (S812: YES), then the process at the time of the document selection is terminated and the procedure returns to the flowchart in FIG. 15.

Figure 18:
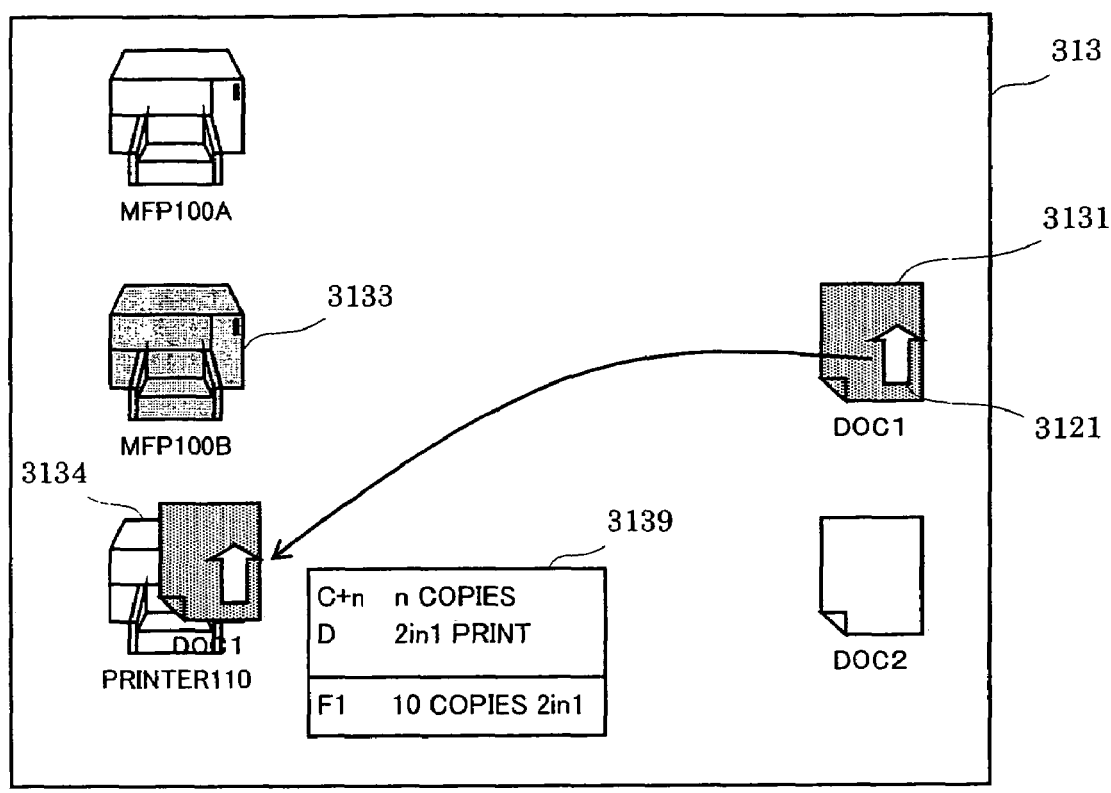
FIG. 18 is a view showing one example of the contents displayed on the display unit 313 at the time of a printer icon selection in the first embodiment.

Next, it is judged whether a printer icon is selected (S705). FIG. 18 is a view showing one example of the contents displayed on the display unit 313 at the time of the printer icon selection. As for whether a printer icon is selected, it is judged that a printer icon is selected in a case where by operating the mouse 312, the icon (icon indicating the file "DOC1" in the example in FIG. 18) of the selected document is dragged onto a position at which the icon is overlapped with any one (an icon 3134 indicating the printer 110 in the example in FIG. 18) of the icons indicating the printers.

Figure 19:
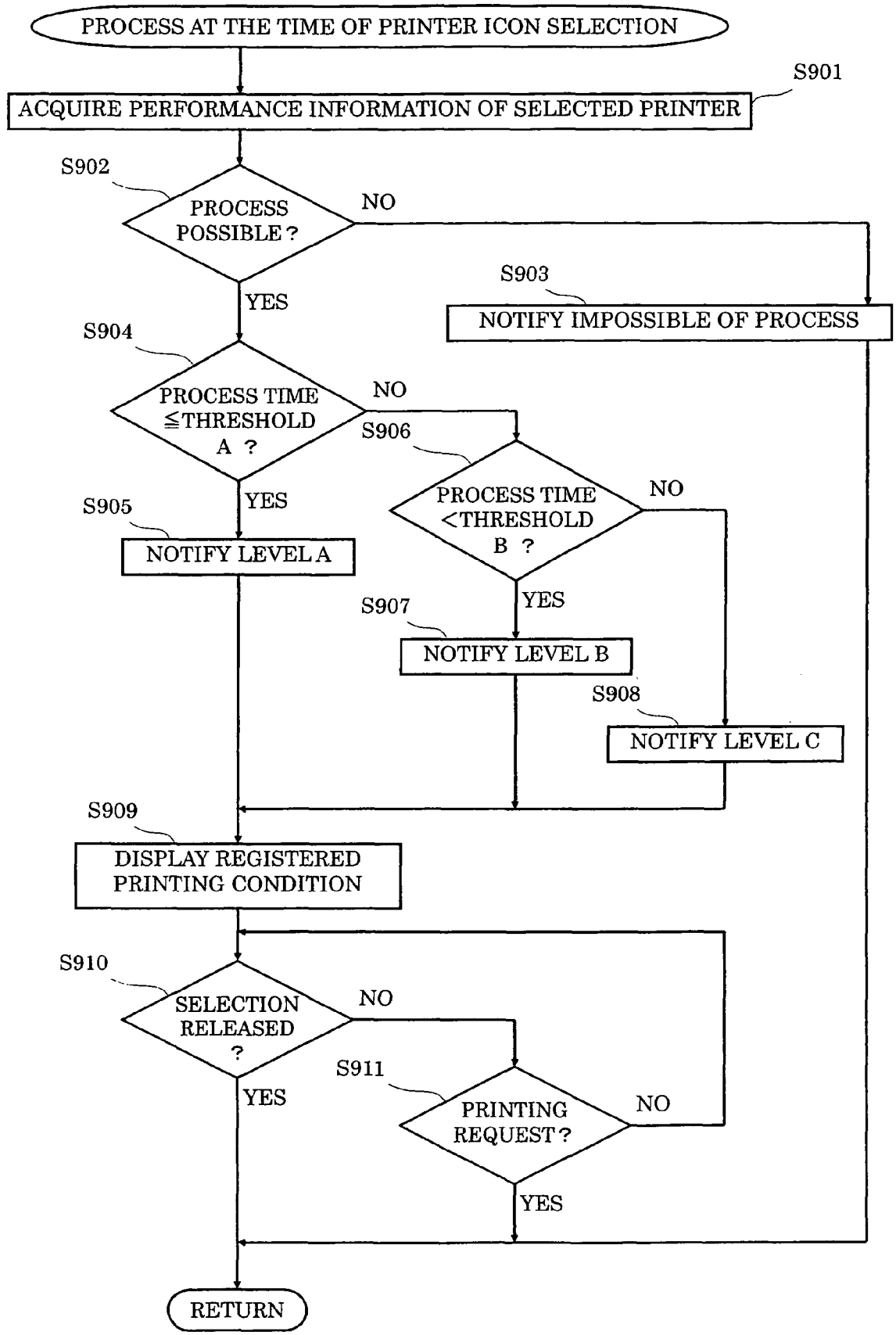
FIG. 19 is a flowchart for illustrating one example of the details of a process at the time of a printer icon selection in the first embodiment.

If a printer icon is selected (S705: YES), then a process at the time of the printer icon selection is performed (S706). FIG. 19 is a flowchart for illustrating one example of the details of a process at the time of the printer icon selection.

In the process at the time of the printer icon selection, first, the performance information, with respect to the selected document, of the selected printer is acquired (S901). This is a process for acquiring the performance information exemplified in FIG. 9, based on the format and the version of the selected document.

If it is not possible to acquire the performance information, that is, if the document cannot be processed with the selected printer (S902: NO), then the user is given a notification that indicates the impossible of performing a printing process (S903), and the process at the time of the printer icon selection is terminated. It is possible to give a notification to the user not only by displaying a message on the display unit 313 but also by sounding a predetermined audio file or by vibrating the mouse 312.

If the document can be processed (S903: YES), then first, it is judged whether the value of the process time (see FIG. 9) that is included in the performance information is not greater than the value of the threshold A shown in FIG. 8 (S904). The state in which the value of the process time is not greater than the value of the threshold A refers to a state in which the process time is short and thus the performance is most appropriate (level A). If the value of the process time is not greater than the value of the threshold A (S904: YES), then a notification indicating the level A is given (S905). More specifically, it is also possible to notify that the most appropriate performance is provided for the selected document, not only by a message on the display unit 313 but also by sounding an audio file indicating the level A. To notify the level A, for example, omitting sounding an audio file, or omitting vibrating the mouse 312 may be possible.

If the value of the process time is greater than the value of the threshold A (S904: NO), then it is judged whether the value of the process time is less than the value of the threshold B (S906). If the value of the process time is less than the value of the threshold B (S906: YES), then it is notified that the most appropriate performance is not provided (level B) (S907). More specifically, it is possible to give a notification not only by displaying a message on the display unit 313 but also by sounding an audio file indicating the level B or by slightly vibrating the mouse 312.

If the value of the process time is not less than the value of the threshold B (S906: NO), then it is notified that the performance is in a level lower than the level B (level C) (S908). More specifically, it is possible to give a notification not only by displaying a message on the display unit 313 but also by sounding an audio file indicating the level C or by vibrating the mouse 312 more intensely than in the level B.

Next, referring to the contents of the printing condition setting table exemplified in FIG. 14, a list of input keys (referred to as "KEY" in FIG. 14) of the keyboard 311 and the names of the printing conditions that are registered with respect to the selected printer icon is displayed (S909). There is no special limitation regarding a display method, but in the example in FIG. 18, a list of registered printing condition is displayed in a list display box 3139. By looking at this display, the user can confirm which printing condition is applied in printing by pressing one or more keys on the keyboard 311. It is preferable to display the list of the registered printing condition as that in the list display box 3139 after a predetermined time (such as several seconds) has passed since an overlap event of the icons was detected with the mouse event detector 4101.

Next, it is judged whether the selection of the printer icon has been released (S910). For example, if an icon of a document file that has been once dragged onto a printer icon is moved apart from the printer icon without being dropped thereonto, then it is judged that the selection has been released. If the selection of the printer has been released (S910: YES), then the process at the time of the printer selection is terminated.

If the selection has not been released (S910: NO), then it is judged whether a printing request is given (S911). In this embodiment, in the example in FIG. 19, if an icon indicating a document is dragged and dropped onto any one of icons indicating printers, then it is judged that a printing request is given. If the selection has not been released and no printing request is given, then the state is in a standby state (S910: NO, S911: NO). During the standby state, the list display box 3139 showing the printing conditions is continuously displayed as in the example in FIG. 18.

Figure 20:
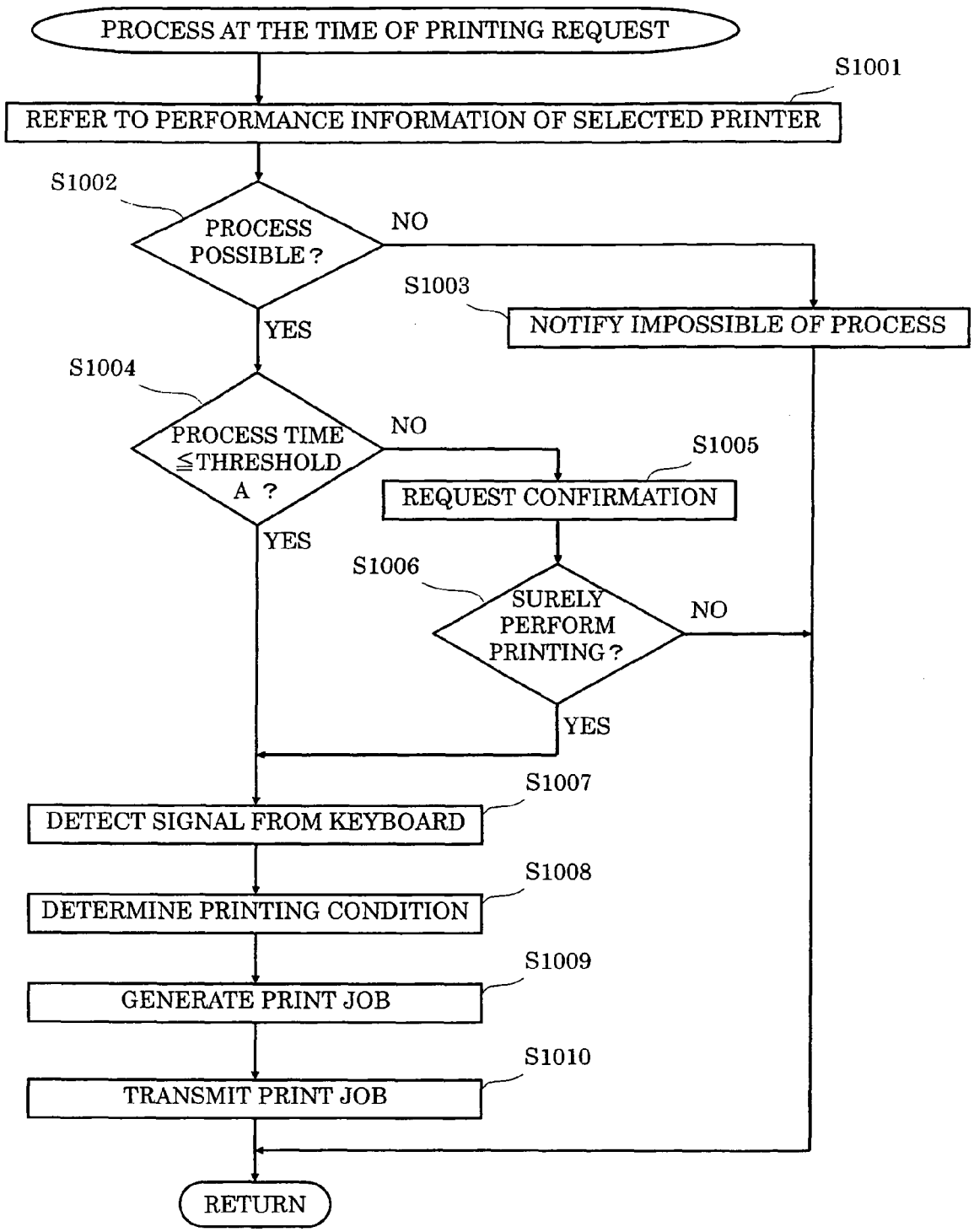
FIG. 20 is a flowchart for illustrating one example of the details of a process at the time of a printing request in the first embodiment.

Referring back to the flowchart in FIG. 15, if a printing request is given (S707: YES), then a process at the time of the printing request is performed (S708). If no printing request is given (S707: NO), then other processes corresponding to events that occur are performed (S709). FIG. 20 is a flowchart for illustrating one example of the details of a process at the time of the printing request.

In the process at the time of the printing request, first, performance information of a selected printer is referred to (S1001). If the selected document cannot be processed with the selected printer (S1002: NO), then the user is given a notification that indicates the impossible of performing a printing process (S1003), and the process at the time of the printing request is terminated. In the judgment in Step S1002, it is judged that the processing is not possible, for example, when performance information corresponding to the document format of the selected document file is not stored. Furthermore, in Step S1003, it is possible to notify that the processing is not possible, for example, by displaying a state in which the document icon that has been dragged and dropped is repelled by the printer icon, or by displaying a message indicating that the printing process cannot be performed with the selected printer.

If the processing is possible (S1002: YES), then referring to the performance information, it is judged whether the value of the process time is not greater than the value of the threshold A (corresponding to the level A) (S1004). If the value of the process time is greater than the value of the threshold A (S1004: NO), then the user is given a notification indicating that and is requested to confirm whether to surely give a printing request (S1005). More specifically, it is possible to receive a select input indicating whether or not to surely perform printing after giving the notification, but it is also possible to preset whether or not to give a printing request without confirmation if the value of the process time is greater than the value of the threshold A. If the confirmation of performing printing request is not given (S1006: NO), then the process at the time of the printing request is terminated.

If a printing request is given (S1006: YES), in the example in FIG. 18, a signal input from the keyboard 311 at the timing when the document icon 3131 is dropped is detected (S1007), and the printing condition is determined referring to the printing condition setting table (S1008). It should be noted that if there is no input from the keyboard 311, it is possible to apply the printing condition that is set as the default setting, for example. It is also possible to store the default setting in the printing condition setting table.

Subsequently, following the determined printing condition, the print job generating unit 4103 generates a print job (S1009), and the print job is transmitted to the selected printer (S1010). In the printer to which the print job is submitted, the selected document is printed based on the determined printing condition.

(7) Processing details of the information processing apparatus (registration to the printing condition setting table)

Figure 21:
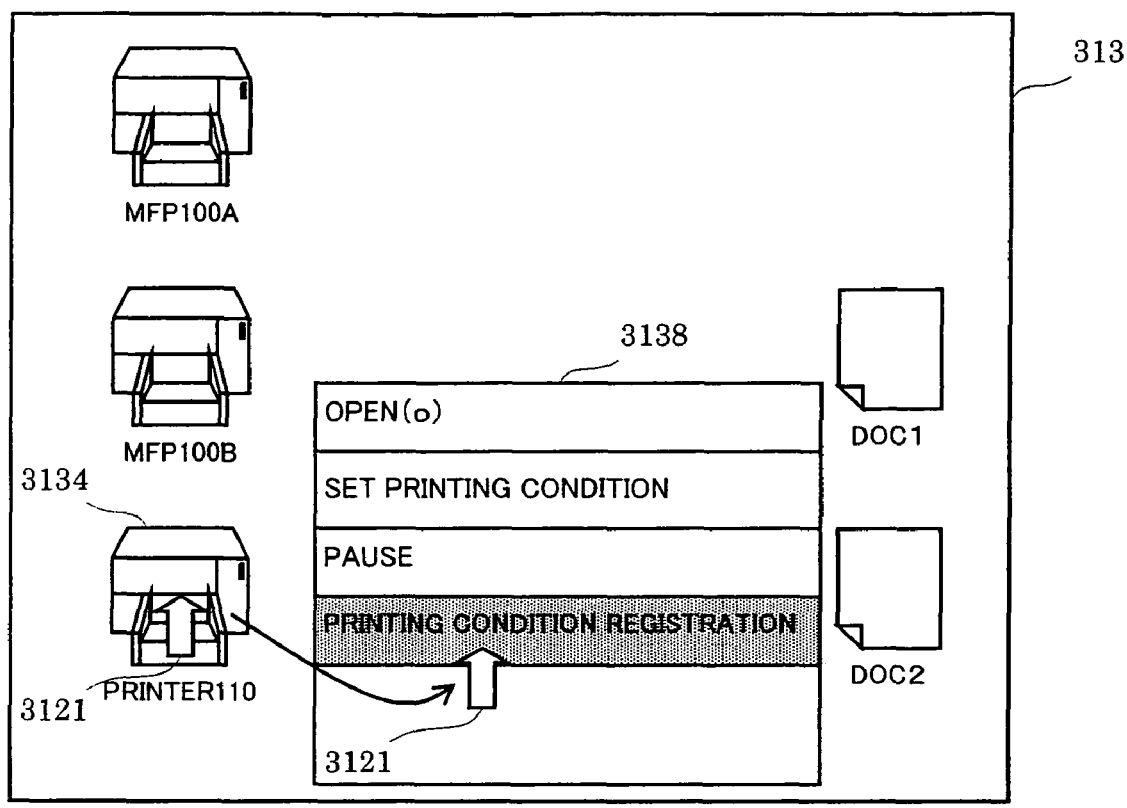
FIG. 21 is a view showing one example of a menu that is displayed when a mouse cursor is moved onto a printer icon and its right button is clicked.

Herein, a contents registration process to the printing condition setting table exemplified in FIG. 14 is described. The user selects a printer icon whose printing conditions are to be registered, displayed on the display unit 313, and selects "printing condition registration" from a menu displayed when the right button of the mouse 312 is clicked for example. FIG. 21 is a view showing one example of a menu that is displayed when the mouse cursor 3121 is moved onto a printer icon 3134 and the right button is clicked. In the example in FIG. 21, if "printing condition registration" displayed on a menu 3138 is selected, then it is possible to display a printing condition registration screen as exemplified in FIG. 22.

On a printing condition registration screen 3137, it is possible to specify the contents that are set in the printing condition setting table shown in FIG. 14, more specifically, the input key of the keyboard 311, the name of the registered printing condition, the number of copies, print type (setting of one-side printing, two-side printing or 2in1 printing etc.), the paper feed tray, whether to perform a staple process and a punch process, for each printer icon ID. It is also possible to display and acquire inputted setting only for the functions that are provided in the printer referring to the function information of the printer.

After the printing conditions are set on the printing condition registration screen 3137, it is possible to register the printing conditions by pressing an OK button 31371. As shown in FIG. 14, as the printing condition settings, the number of copies, print type (setting of one-side printing, two-side printing or 2in1 printing etc.), the set paper feed tray, whether or not to perform a staple process and a punch process (indicated by Y or N) are registered. When a permitted user button 31372 is pressed on the printing condition registration screen 3137, a permitted user registration screen (not shown) is displayed, and the user can set a permitted user for the registered printing condition on this screen.

Embodiment 2

In the first embodiment, a printing request is given by, first, selecting an icon of a file to be printed, and then dragging the icon onto a printer icon and dropping the file icon onto the printer icon. In this embodiment, a process performed in a case where, first, a printer icon is selected, and then dragged onto an icon of a file to be printed and dropped thereonto is described.

Figure 23:
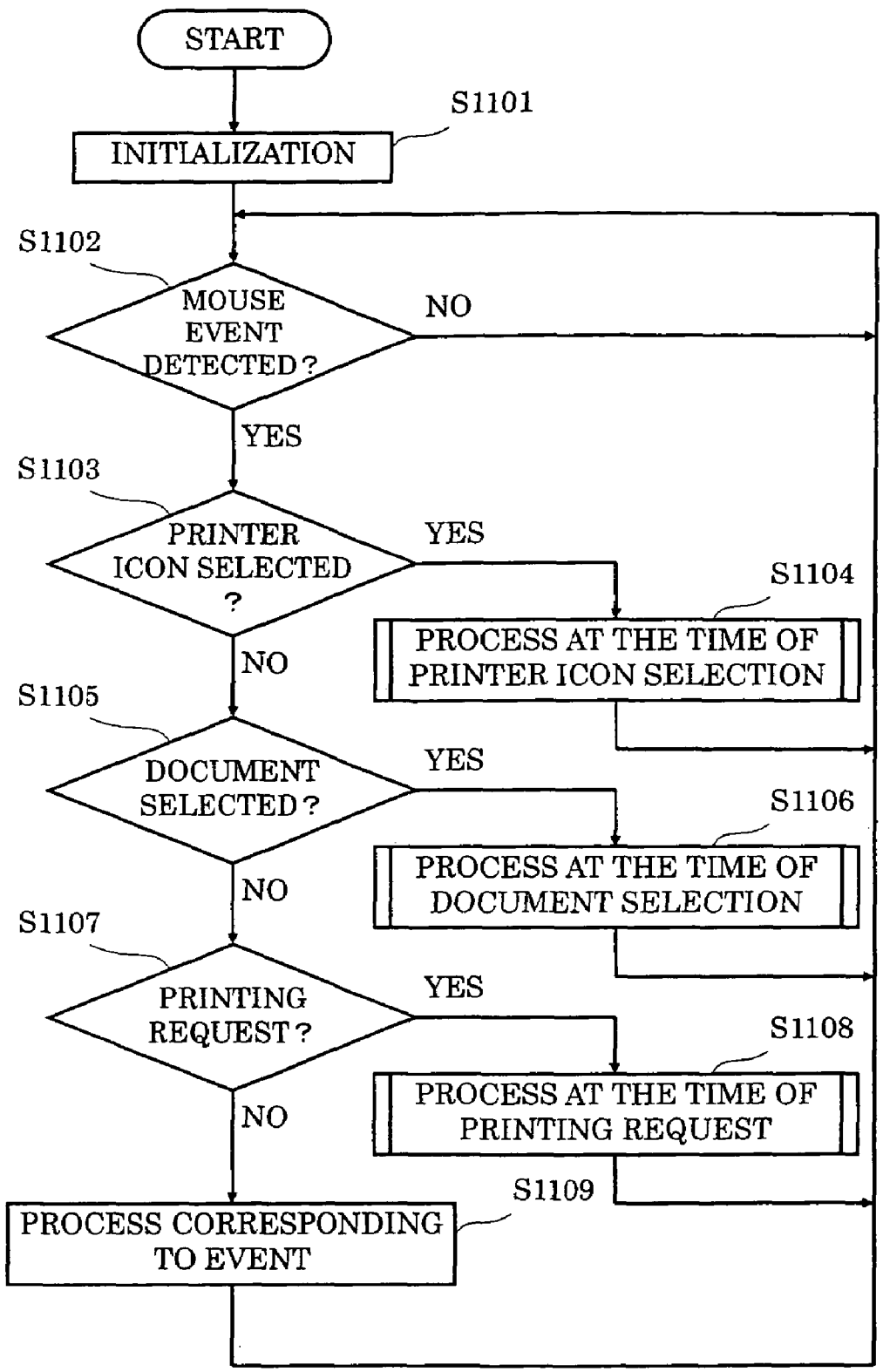
FIG. 23 is a flowchart for illustrating one example of the processing details of the PC 31 in a second embodiment.

FIG. 23 is a flowchart for illustrating one example of the processing details of the PC 31 in this embodiment. In the example in FIG. 23, first, the initialization such as a process to clear the memory is performed (S1101). Then, it is detected whether a mouse event has occurred (S1102). If a mouse event is detected (S1102: YES), then the procedure proceeds to the following processes.

Figure 24:
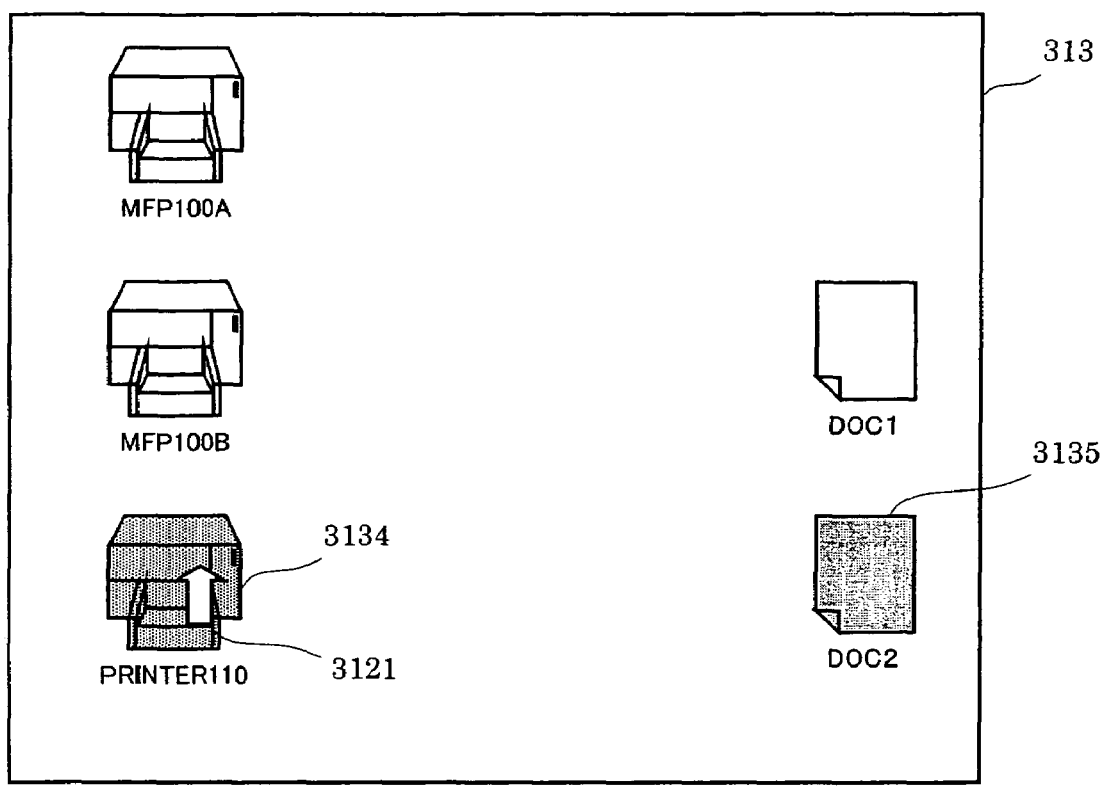
FIG. 24 is a view showing one example of the contents displayed on the display unit 313 in the second embodiment.

When a mouse event is detected, first, it is judged whether any one of the printer icons, among the icons that are displayed on the display unit 313, is selected with the mouse 312 (S1103). FIG. 24 is a view showing one example of the contents displayed on the display unit 313 in this embodiment.

It is possible to judge, for example, by detecting that any one (the icon 3134 indicating the printer 110 in the example in FIG. 24) of the printer icons that are displayed on the display unit 313 is selected by operating a button of the mouse 312 (for example, by positioning the mouse cursor 3121 on the icon and clicking the left button).

Figure 25:
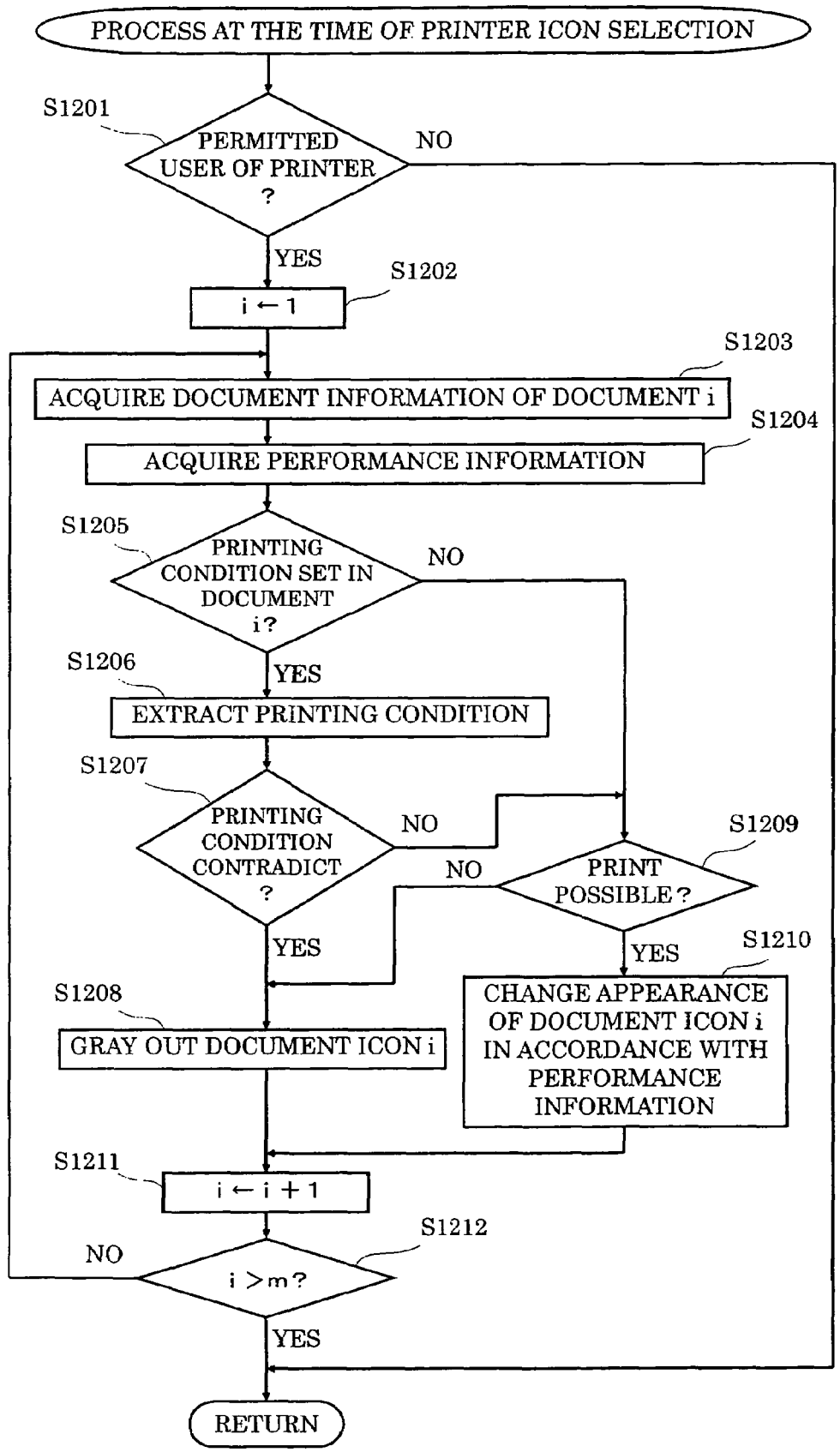
FIG. 25 is a flowchart for illustrating one example of the details of a process at the time of a printer icon selection in the second embodiment.

If a printer icon is selected (S1103: YES), then a process at the time of the printer icon selection is performed (S1104). FIG. 25 is a flowchart for illustrating one example of the details of a process at the time of the printer icon selection.

In the process at the time of the printer icon selection of this embodiment, first, it is judged whether a currently operating user is a permitted user for the selected printer (S1201). It is possible to perform the judgment, for example, by referring to the printing condition setting table. If the user is not a permitted user (S1202: NO), then the process at the time of the printer icon selection is terminated.

If the user is a permitted user (S1202: YES), then a variable i indicating a document is set to 1 (S1202), and document information of the document i is acquired (S1203). This document information is information such as the document format (such as PDF and TIFF) and the format version. This process is similar to that in Step S801 in FIG. 17 in the first embodiment.

After the document information is acquired, performance information is read out from the function information storing region 3234, based on the document format and the format version (S1204). After the performance information is acquired, then it is judged whether a printing condition is set for the document i (S1205) as in Step S806 in FIG. 17. If a printing condition is set for the document i (S1205: YES), then the printing condition is extracted (S1206), and it is judged whether the printing condition set for the document i contradicts the printing conditions operable on the printer indicated by the selected printer icon (S1207). This process is similar to that in Step S808 in FIG. 17. If the printing condition set for the document i is not operable on the selected printer (S1207: YES), then the icon of the document i is grayed out (S1208).

If no printing condition is set for the document i (S1205: NO), or if the printing condition set for the document i is operable (S1207: NO), then it is judged whether the document i can be processed with the selected printer (S1209). If the printing processing is not possible (S1209: NO), then the icon of the document i is grayed out (S1208). In the example in FIG. 24, an icon 3135 indicating a document file "DOC2" is grayed out.

If the processing is possible (S1209: YES), then the display of the icon of the document i is changed in accordance with the processing performance (S1210). For example, referring to the performance information, if the value of the process time is not greater than the value of the threshold A (it is judged that the printer is most appropriate as a printer used), then the icon of the document i is displayed in blue. If the value of the process time is between the value of the threshold A and the value of the threshold B, then the icon of the document i is displayed in yellow. If the value of the process time is not less than the value of the threshold B (it is judged that the printer is not so appropriate as a printer used), then the icon of the document i is displayed in red for alerting the user.

If the above-described process has been completed with respect to all document icons that are displayed on the display unit 313 (S1212: YES), then the process at the time of the printer icon selection is terminated and the procedure returns to the flowchart in FIG. 23. A value m in Step S1212 refers to the number of document icons that are displayed on the display unit 313.

Figure 26:
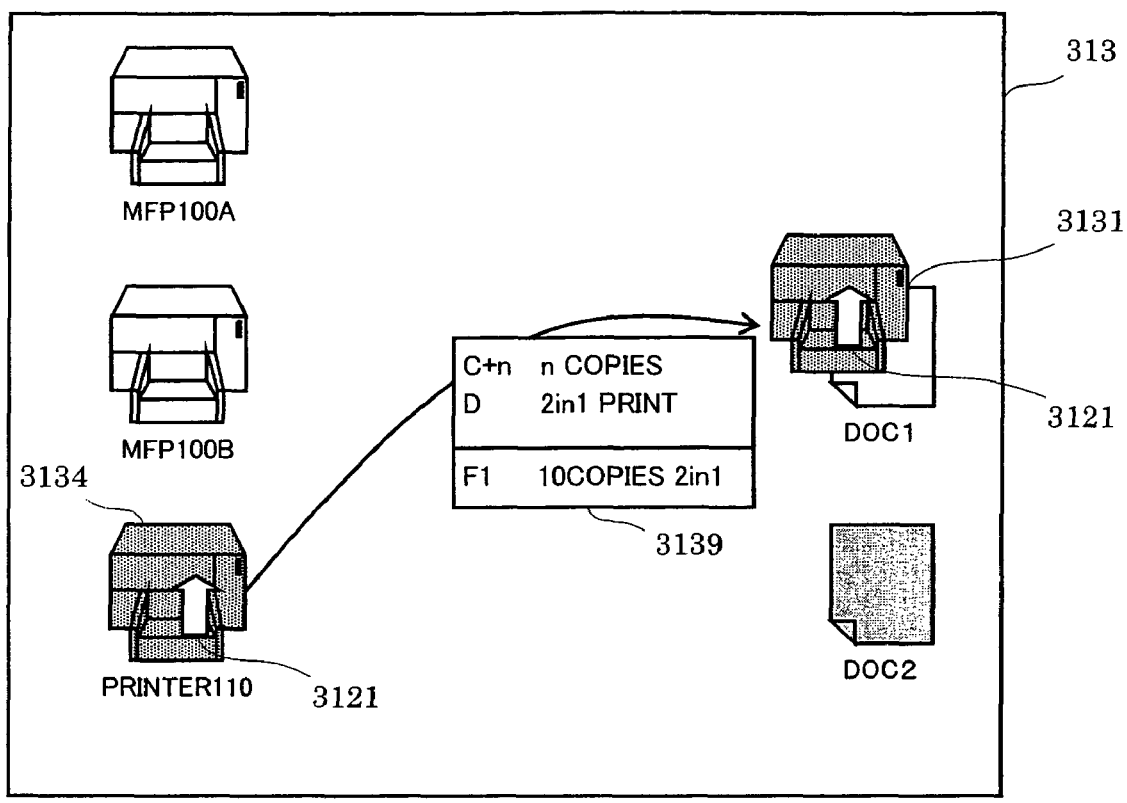
FIG. 26 is a view showing one example of the contents displayed on the display unit 313 at the time of a document selection in the second embodiment.

Next, it is judged whether a document is selected (Silo5). FIG. 26 is a view showing one example of the contents displayed on the display unit 313 at the time of the document selection in this embodiment. As for whether or not a document is selected, it is judged that a document is selected in a case where by operating the mouse 312, the icon (the icon 3134 indicating the printer 110 in the example in FIG. 26) of the selected printer is dragged onto a position at which the icon is overlapped with any one (the icon 3131 indicating the file "DOC1" in the example in FIG. 26) of the icons indicating the documents.

Figure 27:
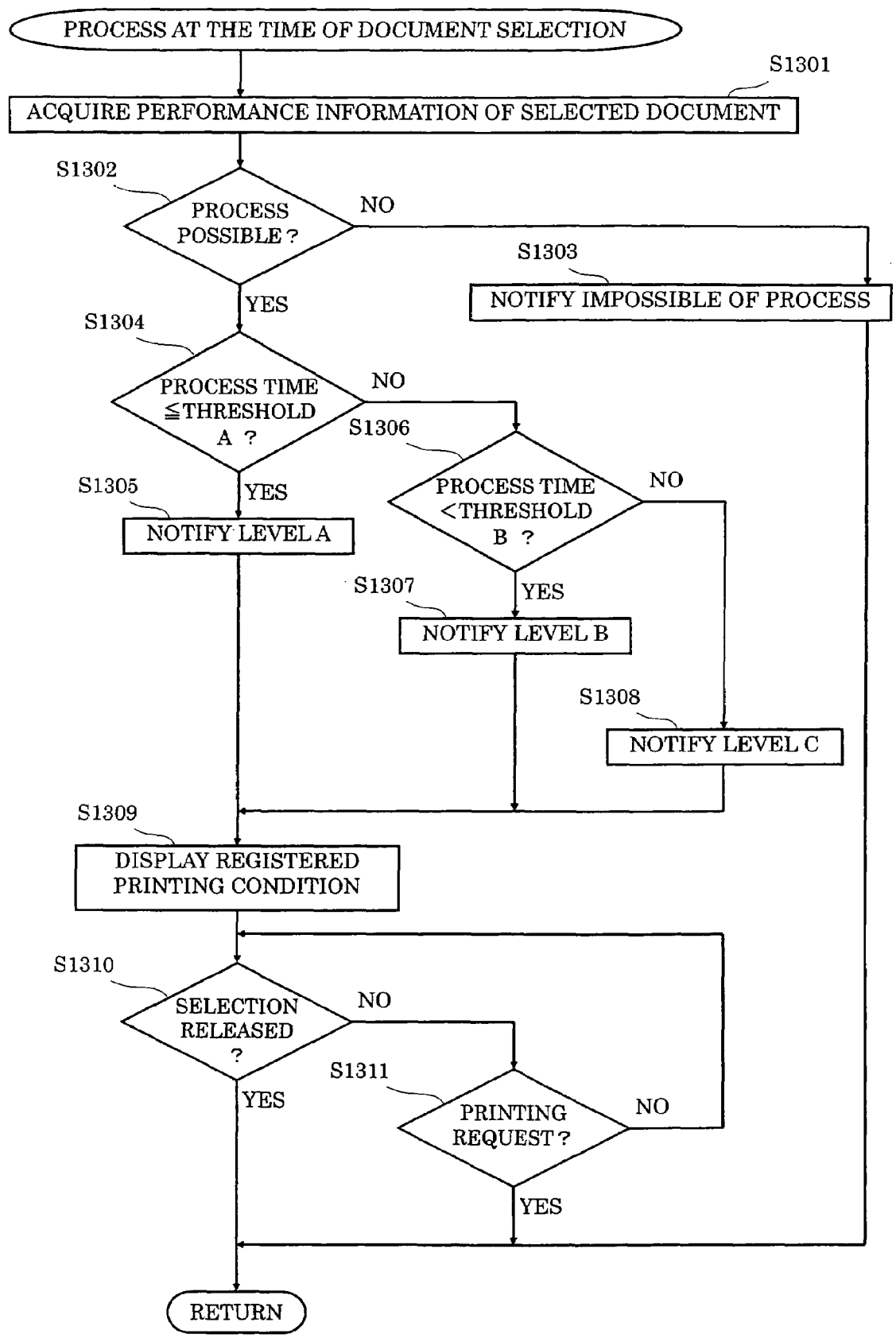
FIG. 27 is a flowchart for illustrating one example of the details of a process at the time of a document selection in the second embodiment.

If a document is selected (S1105: YES), then a process at the time of the document selection is performed (S1106). FIG. 27 is a flowchart for illustrating one example of the details of a process at the time of the document selection in this embodiment.

In the process at the time of the document selection, first, the performance information, with respect to the selected document, of the selected printer is acquired (S1301). This is a process for acquiring the performance information exemplified in FIG. 9, based on the format and the version of the selected document.

If it is not possible to acquire the performance information, that is, if the document cannot be processed with the selected printer (S1302: NO), then the user is given a notification that indicates the impossible of performing a printing process (S1303), and the process at the time of the document selection is terminated. It is possible to give a notification to the user not only by displaying a message on the display unit 313 but also by sounding a predetermined audio file or by vibrating the mouse 312.

If the document can be processed (S1302: YES), then first, it is judged whether the value of the process time (see FIG. 9) that is stored as the processing performance is not greater than the value of the threshold A shown in FIG. 8 (S1304). If the value of the process time is not greater than the value of the threshold A (S1304: YES), then a notification indicating the level A is given (S1305). This process is similar to that in Step S905 in the flowchart in FIG. 19.

If the value of the process time is greater than the value of the threshold A (S1304: NO), then it is judged whether the value of the process time is less than the value of the threshold B (S1306). If the value of the process time is less than the value of the threshold B (S1306: YES), then it is notified that the processing performance is in the level B (S1307). This process is similar to that in Step S907 in FIG. 19.

If the value of the process time is not less than the value of the threshold B (S1306: NO), then it is notified that the processing performance is in the level C (S1308). This process is similar to that in Step S908 in FIG. 19.

Next, referring to the contents of the printing condition setting table exemplified in FIG. 14, a list of the input keys of the keyboard and the names of the printing condition that are registered with respect to the selected printer icon is displayed (S1309). This process is similar to that in Step S909 in FIG. 19. More specifically, as exemplified in FIG. 26, it is possible to display the list of the registered printing condition in the list display box 3139. By looking at this display, the user can confirm which printing condition is applied in printing by pressing a key of the keyboard 311.

Next, it is judged whether the selection of the document icon has been released (S1310). For example, if a printer icon that has been once dragged onto a document icon is moved apart from the document icon without being dropped thereonto, then it is judged that the selection has been released. If the selection of the document has been released (S1310: YES), then the process at the time of the document selection of this embodiment is terminated.

If the selection has not been released (S1310: NO), then it is judged whether a printing request is given (S1311). In this embodiment, in the example in FIG. 26, if an icon indicating a printer is dragged and dropped onto any one of icons indicating documents, then it is judged that a printing request is given. If the selection has not been released and no printing request is given, then the state is in a standby state (S1310: NO, S1311: NO). During the standby state, the list display box 3139 showing the registered printing conditions is continuously displayed as in the example in FIG. 26.

Figure 28:
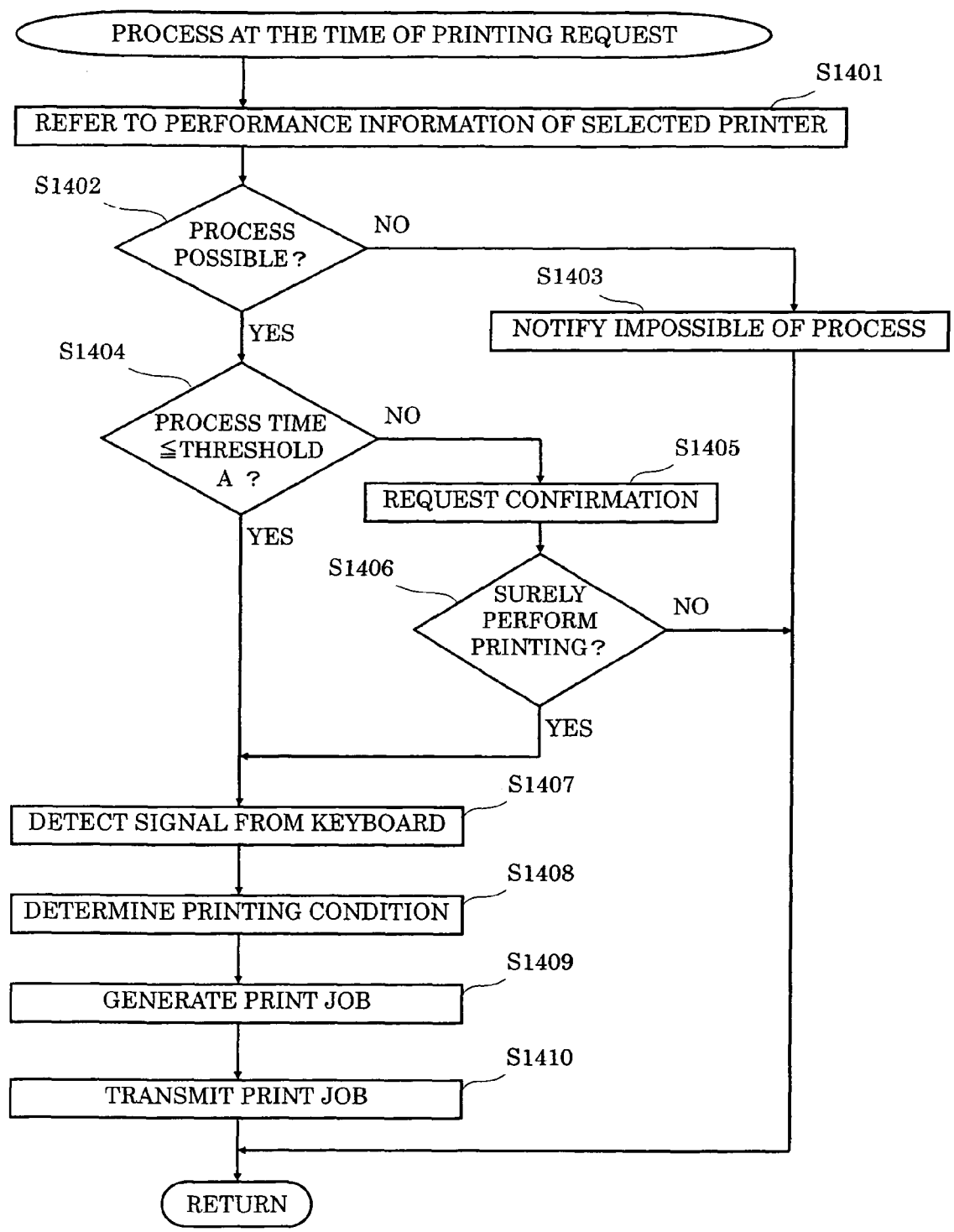
FIG. 28 is a flowchart for illustrating one example of the details of a process at the time of a printing request in the second embodiment.

Referring back to the flowchart in FIG. 23, if a printing request is given (S1107: YES), then a process at the time of the printing request is performed (S1108). If no printing request is given (S1107: NO), then other processes corresponding to a detected event are performed (S1109). FIG. 28 is a flowchart for illustrating one example of the details of a process at the time of the printing request in this embodiment.

First, a reference is made to performance information of a selected printer (S1401). If the selected document cannot be processed with the selected printer (S1402: NO), then the user is given a notification that indicates the impossible of performing a printing process (S1403), and the process at the time of the printing request is terminated. This process is similar to those in Steps S1002 and S1003 in FIG. 20. In step S1403, it is possible to notify that the processing is not possible, for example, by displaying a state in which the printer icon that has been dragged and dropped is repelled by the document icon, or by displaying a message indicating that the printing process of the selected document cannot be performed on the selected printer.

If the processing is possible (S1402: YES), then referring to the performance information, it is judged whether the value of the process time is not greater than the value of the threshold A (corresponding to the level A) (S1404). If the value of the process time is greater than the value of the threshold A (S1404: NO), then the user is given a notification indicating that and is requested to confirm whether to surely give a printing request (S1405). More specifically, it is possible to receive a select input indicating whether or not to surely perform printing after giving the notification, but it is also possible to preset whether or not to give a printing request without confirmation if the value of the process time is greater than the value of the threshold A. If the confirmation of performing printing request is not given (S1406: NO), then the process at the time of the printing request is terminated.

If a printing request is given (S1406: YES), in the example in FIG. 26, a signal input from the keyboard 311 at the timing when the printer icon is dropped is detected (S1407), and the printing condition is determined referring to the printing condition setting table (S1408). It should be noted that if there is no input from the keyboard 311, it is possible to apply the printing condition that is set as the default setting, for example.

Subsequently, following the determined printing condition, the print job generating unit 4103 generates a print job (S1409), and the print job is transmitted to the selected printer (S1410). In the printer to which the print job is submitted, the selected document is printed based on the determined printing condition.

MODIFIED EXAMPLES

In the foregoing, the embodiments of the present invention have been described, but the present invention is of course not limited to the specific examples illustrated in the above embodiments, and modified examples as shown below can be contemplated, for example.

(1) In the foregoing embodiments, an example is described in which the information processing apparatus (the PC 31) that transmits a print job and the printers are connected via the LAN 500. However, in a network, the connection form is not limited to a LAN and it is also possible to apply the present invention in a WAN (wide area network), or a network using a dedicated line or a public line. Furthermore, it is also possible to apply the present invention in a dedicated cable connection or an infrared communication, instead of a network connection.

(2) In the foregoing embodiment, a mode is applied in which a permitted user is registered for each printer in the printing condition setting table (see FIG. 14), and if a user is not a permitted user for a printer, then the printer icon is grayed out (see FIG. 16 and Step S805 in FIG. 17, for example). However, on a screen as exemplified in FIG. 22, it is also possible to register a permitted user for each printing condition (corresponding to a key of the keyboard 311). In this case, in the list display box 3139 on a screen as exemplified in FIG. 18, it is also possible to display each registered printing condition in an identifiable manner depending on whether a currently operating user is a permitted user for the registered printing condition.

Figure 29:
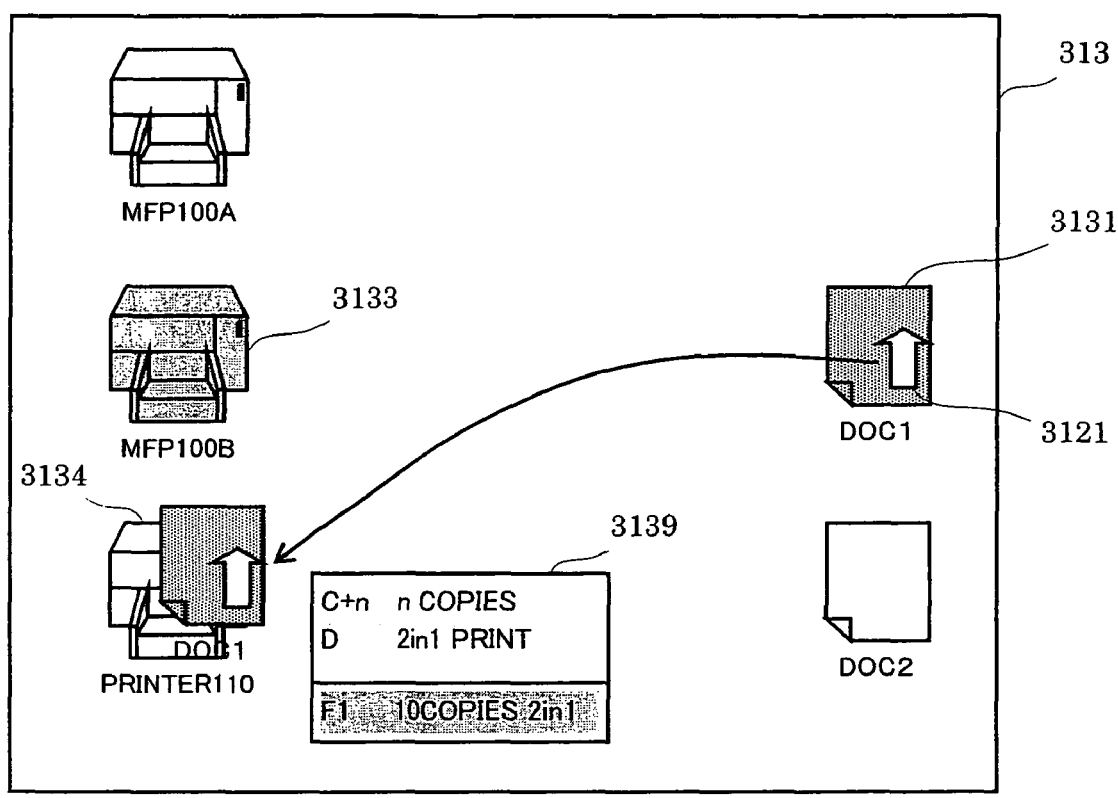
FIG. 29 is a view showing one example of the display on the display unit 313 in a case where each registered printing condition is displayed in an identifiable manner depending on whether a currently operating user is a permitted user for each printing condition, in a list display box 3139 for displaying a list of registered printing condition.

FIG. 29 is a view showing one example of the display on the display unit 313 in a case where the above-described process is performed. In FIG. 29, if a currently operating user is a user who is not permitted to apply the printing condition corresponding to a key F1, then a portion indicating the key F1 is displayed in an identifiable manner. Herein, "displayed in an identifiable manner" also refers to a state in which a non-permitted key is not displayed. It is also possible to perform a similar process in the second embodiment (FIG. 26).

(3) In the foregoing embodiments, a configuration is described in detail in which a printing request is submitted in a case where drag and drop events are detected. However, a method for giving a printing request is not limited to drag and drop, and it is also possible to apply a configuration in which when a document icon is first selected by operating (such as clicking) a mouse button and then a printer icon is selected by operating (such as clicking) the mouse button, it is recognized that a printing request is given and a printing process is performed. Furthermore, it goes without saying that a configuration can be also applied in which when a printer icon is first selected by clicking a mouse button and then a document icon is selected by clicking the mouse button, it is recognized that a printing request is given and a printing process is performed.

In this case, it is possible to change the display of icons as described above in a similar manner depending on whether the processing is possible or not, whether the printing condition stored in the document file contradicts, or whether the user is a permitted user or not, for example. For example, when a document is selected first by clicking the mouse button, it is possible to gray out printers with which the processing is not possible, and when a printer is selected first by clicking the mouse button, it is possible to gray out documents that cannot be processed.

(4) In the foregoing embodiments, when a plurality of keys are pressed, for example, Ctrl key and a numeric key (see FIG. 18 "C+n"), a configuration in which a registered printing condition corresponding to the pressed keys can be applied is described. However, it is also possible to apply a configuration in which if a plurality of keys are pressed, then only the operation on any one (such as the first key or the last key that is detected to be pressed) of the keys is recognized as a valid operation, or a plurality of jobs are generated corresponding to the plurality of keys. Furthermore, it is also possible to apply a configuration in which a process that is performed (other than a printing condition) when a plurality of keys are pressed can be set previously.

(5) In the foregoing embodiments, an example was described in which the PC 31 is used as one example of the information processing apparatus. However, as the information processing apparatus, it is also possible to apply various apparatus, such as a mobile terminal, as long as it transmits a printing request.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An information processing apparatus that transmits print data to a printer, comprising:
    a display unit that displays an image on a display screen;
    a pointing device signal receiving unit that receives a signal from a pointing device;
    an input device signal receiving unit that receives a signal from an input device from which when one or more positions are pressed by an operator, a signal corresponding to the pressed positions is output;
    an icon display controller that displays a first icon that indicates the printer and a second icon that indicates a document on the display screen;
    a pointing device event detector that detects that the second icon is dragged and dropped onto the first icon, and/or that the first icon is dragged and dropped onto the second icon, using the pointing device on the display screen;
    an input device signal detector that detects a signal from the input device at the time of detection of the drop event by the pointing device event detector;
    a printing condition setting storing unit that stores a printing condition registered for the printer indicated by the first icon corresponding to a signal detected by the input device signal detector;
    a print data generator that generates print data corresponding to the document indicated by the second icon when the drop event is detected, the print data being to be processed in the printer indicated by the first icon based on a printing condition that corresponds to the signal detected by the input device signal detector; and
    a print data transmitter that transmits generated print data to the printer indicated by the first icon.

2. The information processing apparatus according to claim 1,
    wherein the pointing device event detector further detects that the second icon is dragged and overlapped with the first icon, and/or that the first icon is dragged and overlapped with the second icon, and further comprising:

a printing condition setting display controller that displays relationships on the display screen when an overlap event is continuously detected by the pointing device event detector for a predetermined time, the relationships being relationships between one or more pressed positions of the input device and corresponding printing condition that are stored in the printing condition setting storing unit with respect to the printer that is indicted by the first icon.

3. The information processing apparatus according to claim 2, further comprising:
a printing condition availability judging unit that judges whether the document to be printed that is indicated by the second icon can be processed in each printing condition that is stored in the printing condition setting storing unit with respect to the printer that is indicated by the first icon,
wherein the printing condition setting display controller displays a printing condition in which processing is possible and a printing condition in which processing is not possible in an identifiable manner.

4. The information processing apparatus according to claim 2, further comprising:
a printing condition addition judging unit that judges whether a printing condition is stored in a file of the document to be printed that is indicated by the second icon;
a printing condition extracting unit that extracts the printing condition when the printing condition is stored in the file; and
a printing condition contradiction judging unit that judges whether a printing condition extracted by the printing condition extracting unit is operable in the printer that is indicated by the first icon,
wherein when the printing condition extracted by the printing condition extracting unit is not operable in the printer that is indicated by the first icon, the icon display controller changes a display of the first icon and/or the second icon.

5. The information processing apparatus according to claim 1,
wherein the pointing device event detector detects that the second icon is selected or dragged using the pointing device, or that the first icon is selected or dragged using the pointing device, and
when the document to be printed that is indicated by the second icon cannot be processed with the printer that is indicated by the first icon, the icon display controller changes a display of the first icon and/or the second icon.

6. The information processing apparatus according to claim 1,
wherein the input device is provided with a plurality of keys and outputs a different signal when one or more keys that are pressed by an operator are different.

7. The information processing apparatus according to claim 1, further comprising:
a performance information acquiring unit that acquires information indicating printing performance for each printer and each file type of a document to be printed;
a performance information picking up unit that picks up information indicating printing performance in a case where the document to be printed that is indicated by the second icon is printed with the printer that is indicated by the first icon; and
a switching unit that switches subsequent processes based on picked up information indicating printing performance.

8. The information processing apparatus according to claim 7,
wherein the information indicating printing performance is information indicating time necessary for each printer to print a document that has been prepared in advance for each file type.

9. The information processing apparatus according to claim 1, further comprising:
an operator ID acquiring unit that acquires an ID of an operator,
wherein if an operator is not permitted to use the printer that is indicated by the first icon, then the icon display controller changes a display of the first icon.

10. The information processing apparatus according to claim 1, further comprising:
an operator ID acquiring unit that acquires an ID of an operator,
wherein the printing condition setting storing unit includes an ID of an operator that is permitted to designate the registered printing condition for each registered printing condition.

11. An information processing apparatus that transmits print data to a printer, comprising:
a display unit that displays an image on a display screen;
a pointing device signal receiving unit that receives a signal from a pointing device;
an input device signal receiving unit that receives a signal from an input device from which when one or more positions are pressed by an operator, a signal corresponding to the pressed positions is output;
an icon display controller that displays a first icon that indicates the printer and a second icon that indicates a document on the display screen;
a pointing device event detector that detects that the second icon is selected by clicking the pointing device, and that the first icon is selected by clicking the pointing device in a state where the second icon is selected;
an input device signal detector that detects a signal from the input device at the time of detection of the select event of the first icon by the pointing device event detector;
a printing condition setting storing unit that stores a printing condition registered for the printer indicated by the first icon corresponding to a signal detected by the input device signal detector;
a print data generator that generates print data corresponding to the document indicated by the second icon when the select event of the first icon is detected, the print data being to be processed in the printer indicated by the first icon based on a printing condition that corresponds to the signal detected by the input device signal detector; and
a print data transmitter that transmits generated print data to the printer indicated by the first icon.

12. The information processing apparatus according to claim 11,
wherein when a select event of the second icon is detected by the pointing device event detector, if the document to be printed that is indicated by the second icon cannot be processed with the printer that is indicated by the first icon, then the icon display controller changes a display of the first icon.

13. An information processing apparatus that transmits print data to a printer, comprising:
a display unit that displays an image on a display screen;
a pointing device signal receiving unit that receives a signal from a pointing device;

an input device signal receiving unit that receives a signal from an input device from which when one or more positions are pressed by an operator, a signal corresponding to the pressed positions is output;

an icon display controller that displays a first icon that indicates the printer and a second icon that indicates a document on the display screen;

a pointing device event detector that detects that the first icon is selected by clicking the pointing device, and that the second icon is selected by clicking the pointing device in a state where the first icon is selected;

an input device signal detector that detects a signal from the input device at the time of detection of the select event of the second icon by the pointing device event detector;

a printing condition setting storing unit that stores a printing condition registered for the printer indicated by the first icon corresponding to a signal detected by the input device signal detector;

a print data generator that generates print data corresponding to the document indicated by the second icon when the select event of the second icon is detected, the print data being to be processed in the printer indicated by the first icon based on a printing condition that corresponds to the signal detected by the input device signal detector; and a print data transmitter that transmits generated print data to the printer indicated by the first icon.

14. The information processing apparatus according to claim 13, wherein when a select event of the first icon is detected by the pointing device event detector, if the document to be printed that is indicated by the second icon cannot be processed with the printer that is indicated by the first icon, then the icon display controller changes a display of the second icon.

15. A printing instruction method in an information processing apparatus that transmits print data to a printer, comprising:

an icon displaying step of displaying a first icon that indicates the printer and a second icon that indicates a document on a display screen;

a drop event detecting step of detecting that the second icon is dragged and dropped onto the first icon, and/or that the first icon is dragged and dropped onto the second icon, using a pointing device on the display screen;

an input signal detecting step of detecting a signal that is output from an input device from which when one or more positions are pressed by an operator, a signal corresponding to the pressed positions is output, at the time of detection of the drop event in the drop event detecting step;

a printing condition determination step of determining a printing condition based on a signal detected in the input signal detecting step, referring to a printing condition setting storing unit that stores a printing condition registered for the printer indicated by the first icon corresponding to a signal detected in the input signal detecting step; and a print data transmitting step of transmitting print data corresponding to the document indicated by the second icon to the printer indicated by the first icon, the print data being to be being to be processed in the printer based on a printing condition that is determined in the printing condition determination step.

16. The printing instruction method according to claim 15, further comprising:

a dragged icon overlap event detecting step of detecting that the second icon is dragged and overlapped with the first icon, and/or that the first icon is dragged and overlapped with the second icon; and a printing condition setting displaying step of displaying relationships between one or more pressed positions of the input device and a registered printing condition that are stored in the printing condition setting storing unit with respect to the printer that is indicated by the first icon, when an overlap event is continuously detected in the dragged icon overlap event detecting step for a predetermined time.

17. The printing instruction method according to claim 16, further comprising:

a printing condition availability judging step of judging whether the document to be printed that is indicated by the second icon can be processed in each registered printing condition that is stored in the printing condition setting storing unit with respect to the printer that is indicated by the first icon, wherein in the printing condition setting displaying step, a registered printing condition in which processing is possible and a registered printing condition in which processing is not possible are displayed in an identifiable manner.

18. A printing instruction method in an information processing apparatus that transmits print data to a printer, comprising:

an icon displaying step of displaying a first icon that indicates the printer and a second icon that indicates a document on a display screen;

a second icon select event detecting step of detecting that the second icon is selected by clicking a pointing device on the display screen;

a first icon select event detecting step of detecting that the first icon is selected by clicking the pointing device in a state where the second icon is selected;

an input signal detecting step of detecting a signal that is output from an input device from which when one or more positions are pressed by an operator, a signal corresponding to the pressed positions is output, at the time of detection of the select event of the first icon in the first icon select event detecting step;

a printing condition determination step of determining a printing condition based on a signal detected in the input signal detecting step, referring to a printing condition setting storing unit that stores a printing condition registered for the printer indicated by the first icon corresponding to a signal detected in the input signal detecting step; and a print data transmitting step of transmitting print data corresponding to the document indicated by the second icon to the printer indicated by the first icon, the print data being to be processed in the printer based on a printing condition that is determined in the printing condition determination step.

19. A printing instruction method in an information processing apparatus that transmits printing command data to a printer, comprising:

an icon displaying step of displaying a first icon that indicates the printer and a second icon that indicates a document on a display screen;

a first icon select event detecting step of detecting that the first icon is selected by clicking a pointing device on the display screen;

a second icon select event detecting step of detecting that the second icon is selected by clicking the pointing device in a state where the first icon is selected;

an input signal detecting step of detecting a signal that is output from an input device from which when one or more positions are pressed by an operator, a signal corresponding to the pressed positions is output, at the time of detection of the select event of the second icon in the second icon select event detecting step;

a printing condition determination step of determining a printing condition based on a signal detected in the input signal detecting step, referring to a printing condition setting storing unit that stores a printing condition registered for the printer indicated by the first icon corresponding to a signal detected in the input signal detecting step; and a print data transmitting step of transmitting print data corresponding to the document indicated by the second icon to the printer indicated by the first icon, the print data being to be processed in the printer based on a printing condition that is determined in the printing condition determination step.

20. A storage medium storing a program that is to be installed on an information processing apparatus that transmits a print data to a printer, wherein the program lets the information processing apparatus execute:

a pointing device input receiving process of receiving an input from a pointing device;

an input receiving process of receiving an input from an input device from which when one or more positions are pressed by an operator, a signal corresponding to the pressed positions is output;

an icon display process of displaying a first icon that indicates the printer and a second icon that indicates a document on a display screen;

a drop event detecting process of detecting that the second icon is dragged and dropped onto the first icon, and/or that the first icon is dragged and dropped onto the second icon, using the pointing device on the display screen;

an input signal detecting process of detecting a signal output from the input device at the time of detection of the drop event in the drop event detecting process;

a printing condition determination process of determining a printing condition based on a signal detected in the input signal detecting process, referring to a printing condition setting storing unit that stores a printing condition registered for the printer indicated by the first icon corresponding to a signal detected in the input signal detecting process; and a printing instruction process of transmitting print data corresponding to the document indicated by the second icon to the printer indicated by the first icon, the print data being to be processed in the printer based on a printing condition that is determined in the printing condition determination process.

21. The storage medium storing the program according to the claim 20, wherein the program further lets the information processing apparatus execute:

a dragged icon overlap event detecting process of detecting that the second icon is dragged and overlapped with the first icon, and/or that the first icon is dragged and overlapped with the second icon; and a printing condition setting displaying process of displaying relationships between one or more pressed positions of the input device and a registered printing condition that are stored in the printing condition setting storing unit with respect to the printer that is indicated by the first icon, when an overlap event is continuously detected in the dragged icon overlap event detecting process for a predetermined time.

22. The storage medium storing the program according to the claim 21, wherein the program further lets the information processing apparatus execute:

a printing condition availability judging process of judging whether the document to be printed that is indicated by the second icon can be processed in each registered printing condition that is stored in the printing condition setting storing unit with respect to the printer that is indicated by the first icon, wherein in the printing condition setting displaying process, a registered printing condition in which processing is possible and a registered printing condition in which processing is not possible are displayed in an identifiable manner.

23. A storage medium storing a program that is to be installed on an information processing apparatus that transmits a print data to a printer, wherein the program lets the information processing apparatus execute:

a pointing device input receiving process of receiving an input from a pointing device;

an input receiving process of receiving an input from an input device from which when one or more positions are pressed by an operator, a signal corresponding to the pressed positions is output;

an icon display process of displaying a first icon that indicates the printer and a second icon that indicates a document to be printed on a display screen;

a second icon select event detecting process of detecting that the second icon is selected by clicking the pointing device on the display screen;

a first icon select event detecting process of detecting that the first icon is selected by clicking the pointing device in a state where the second icon is selected;

an input signal detecting process of detecting a signal that is output from the input device at the time of detection of the select event of the first icon in the first icon select event detecting process;

a printing condition determination process of determining a printing condition based on a signal detected in the input signal detecting process, referring to a printing condition setting storing unit that stores a printing condition registered for the printer indicated by the first icon corresponding to a signal detected in the input signal detecting process; and a printing instruction process of transmitting print data corresponding to the document indicated by the second icon to the printer indicated by the first icon, the print data being to be processed in the printer based on a printing condition that is determined in the printing condition determination process.

24. A storage medium storing a program that is to be installed on an information processing apparatus that transmits a print data to a printer, wherein the program lets the information processing apparatus execute:

a pointing device input receiving process of receiving an input from a pointing device;

an input receiving process of receiving an input from an input device from which when one or more positions are pressed by an operator, a signal corresponding to the pressed positions is output;

an icon display process of displaying a first icon that indicates the printer and a second icon that indicates a document to be printed on a display screen;

a first icon select event detecting process of detecting that the first icon is selected by clicking the pointing device on the display screen;

a second icon select event detecting process of detecting that the second icon is selected by clicking the pointing device in a state where the first icon is selected;

an input signal detecting process of detecting a signal that is output from the input device at the time of detection of the select event of the second icon in the second icon select event detecting process;

a printing condition determination process of determining a printing condition based on a signal detected in the input signal detecting process, referring to a printing condition setting storing unit that stores a printing condition registered for the printer indicated by the first icon corresponding to a signal detected in the input signal detecting process; and a printing instruction process of transmitting print data corresponding to the document indicated by the second icon to the printer indicated by the first icon, the print data being to be processed in the printer based on a printing condition that is determined in the printing condition determination process.

* * * * *